US012649670B1

(12) United States Patent
Zhang

(10) Patent No.: US 12,649,670 B1
(45) Date of Patent: Jun. 9, 2026

(54) WATER PURIFIER

(71) Applicant: MAXMART LLC, Wilmington, DE (US)

(72) Inventor: Yiming Zhang, Shenzhen (CN)

( * ) Notice: Subject to any disclaimer, the term of this patent is extended or adjusted under 35 U.S.C. 154(b) by 101 days.

(21) Appl. No.: 19/076,040

(22) Filed: Mar. 11, 2025

(51) Int. Cl.
*C02F 1/00* (2023.01)
*C02F 1/32* (2023.01)
*C02F 1/44* (2023.01)
*C02F 101/20* (2006.01)

(52) U.S. Cl.
CPC .............. *C02F 1/003* (2013.01); *C02F 1/008* (2013.01); *C02F 1/32* (2013.01); *C02F 1/441* (2013.01); *C02F 2101/20* (2013.01); *C02F 2201/005* (2013.01); *C02F 2201/326* (2013.01); *C02F 2209/02* (2013.01); *C02F 2209/10* (2013.01); *C02F 2209/42* (2013.01); *C02F 2303/04* (2013.01); *C02F 2303/16* (2013.01)

(58) Field of Classification Search
None
See application file for complete search history.

(56) References Cited

U.S. PATENT DOCUMENTS

| 2005/0139530 A1* | 6/2005 | Heiss | C02F 9/00 |
| | | | 210/257.2 |
| 2011/0046787 A1* | 2/2011 | Booth | E21B 21/065 |
| | | | 700/271 |
| 2014/0008296 A1* | 1/2014 | Mills | C02F 3/006 |
| | | | 210/123 |
| 2015/0084214 A1* | 3/2015 | Wilson | F04F 5/16 |
| | | | 261/32 |
| 2015/0129776 A1* | 5/2015 | Boodaghians | C02F 1/325 |
| | | | 250/432 R |
| 2017/0319990 A1* | 11/2017 | Jeon | B67D 1/14 |

* cited by examiner

*Primary Examiner* — Richard C Gurtowski
(74) *Attorney, Agent, or Firm* — Daniel M. Cohn; Howard M. Cohn

(57) ABSTRACT

A water purifier includes a water tank assembly, a filtration component, a reversing valve, a refrigeration component, a water outlet nozzle assembly and a controller. The water tank assembly is configured to store pre-filtration water; the filtration component includes a first water inlet end and a first water outlet end, the reversing valve includes a second water inlet end, a second water outlet end and a third water outlet end; the refrigeration component includes a cooling pipeline and a refrigeration module for cooling water in the cooling pipeline, the controller is electrically connected to the reversing valve and the refrigeration module. The water purifier integrates liquid filtration and cooling functions, and eliminates the water storage tank.

19 Claims, 16 Drawing Sheets

1A

192

191

WATER PURIFIER

TECHNICAL FIELD

The present disclosure relates to a technical field of liquid filtration treatment, and in particular to a water purifier.

BACKGROUND

Water filtration systems, such as Under-Sink Water Filtration Systems, have been widely used in the market. Because they are enabled to help people get cleaner, clearer, tastier and safer water. However, these devices are enabled to be connected to a faucet, or connected in series in a water supply pipe, or installed under a sink, which is very inconvenient to use. In these water filtration systems, a water filter (e.g., a replaceable water filter cartridge) is typically used to filter any liquid (e.g., water) dispensed therefrom. Conventional water filter cartridges usually have filter media installed in the outer shell of the water filter cartridge, such as PP cotton, non-woven fabric, activated carbon or other filter media to enhance the water filtering ability. The conventional water filter cartridge further comprises a water inlet port for taking in liquid and distributing water, which is at least partially disposed of in the housing together with the filter medium. The filter medium of the water filter cartridge can absorb or remove pollutants (such as mud, hair, rust and suspended matter) in the water flow, and then convey it to the user for direct use, or according to the user's needs, convey it to related equipment (for example, the water filtration system of a faucet or refrigerator).

In addition, there are some water filtration systems designed for use on countertops, which can solve the problem of the inconvenience of using the under-sink water filtration system. However, these devices generally have a relatively simple water-filtering function and can only obtain filtered water at room temperature. If users want to obtain low-temperature filtered water, they need to use a container to transfer the room-temperature filtered water to the refrigerator and wait for it to cool down. This requires a long wait time, which is very inconvenient.

In addition, some devices solve the above-mentioned problem by installing a cooling water storage tank inside. However, the water storage tank inside the device cannot be moved or cleaned, which may easily cause dirt residue, bacterial growth, odor and other hygiene problems, resulting in contamination of the internal piping system, causing secondary pollution of the filtered water and damaging human health

SUMMARY

In view of the above problems, the present disclosure provides a water purifier that solves the problem of the existing water purifiers having a single function and there is a risk of secondary water pollution.

In order to realize the above purpose, the present disclosure provides the water purifier, comprising a water tank assembly, a filtration component, a reversing valve, a refrigeration component, a water outlet nozzle assembly and a controller; wherein: the water tank assembly is configured to store pre-filtration water; the filtration component comprises a first water inlet end and a first water outlet end, the first water inlet end is fluidly connected with the water tank assembly; the reversing valve comprises a second water inlet end, a second water outlet end and a third water outlet end; the second water inlet end is fluidly connected with the first water outlet end; the refrigeration component comprises a cooling pipeline and a refrigeration module for cooling water in the cooling pipeline, one end of the cooling pipeline is connected to the second water outlet end; the water outlet nozzle assembly is connected to the other end of the cooling pipeline and the third water outlet end respectively; the controller is electrically connected to the reversing valve and the refrigeration module respectively, the controller is configured to control the second water outlet end and/or the third water outlet end of the reversing valve to be in an open state or a closed state, and to control the refrigeration component to operate.

In one optional embodiment, further comprising a housing, the housing is provided with an installation area, the water tank assembly is detachably arranged in the installation area; the filtration component, the reversing valve, the refrigeration component, and the controller are all arranged in the housing; the water outlet nozzle assembly is arranged on an outer surface of the housing.

In one optional embodiment, further comprising a water collection tray, the housing is provided with a water collection area, and the water collection area is concave; the water outlet nozzle assembly is arranged at a top of the water collection area, the water collection tray is arranged at a bottom of the water collection area.

In one optional embodiment, further comprising an operation panel and a power module, the controller is electrically connected to the operation panel and the power module respectively; the operation panel is arranged on the housing, the power module is arranged in the housing, the operation panel is configured to receive control commands from user's input, the controller is configured to control the second water outlet end and/or the third water outlet end of the reversing valve to be in an open or a closed state according to the control commands, and control the refrigeration component to operate.

In one optional embodiment, a water tank detector is installed adjacent to a bottom of the water tank assembly in the installation area, the water tank detector is electrically connected to the controller, a water tank presence detection magnet is installed inside the bottom of the water tank assembly, directly facing the water tank detector, the water tank detector is configured to send a first blocking signal to the controller when it does not detect a magnetic field signal from the water tank presence detection magnet; the controller is further configured to control the second water outlet end and/or the third water outlet end of the reversing valve to be continuously in a closed state according to the first blocking signal.

In one optional embodiment, a liquid level sensor is installed adjacent to a side wall of the water tank assembly in the installation area, the liquid level sensor is electrically connected to the controller, a magnetic float is arranged in the water tank assembly, the liquid level sensor is configured to confirm a first liquid level height in the water tank assembly according to a magnetic field signal of the magnetic float in the water tank assembly, and send the magnetic field signal to the controller; the controller is further configured to send a reminder signal when the first liquid level is lower than a first preset liquid level.

In one optional embodiment, the water tank assembly comprises a tank body and a tank cover, a top of the tank body is open, and the tank cover is detachably arranged on the top of the tank body.

In one optional embodiment, the filtration component comprises a first filter and a second filter, the first water inlet end is arranged at the first filter, the first water outlet end is arranged at the second filter, a first filter water outlet port is fluidly connected with a second filter water inlet port.

In one optional embodiment, the filtration component further comprises a pressure pump, the pressure pump is electrically connected to the controller; the pressure pump is installed on a pipeline between the first water inlet end and the water tank assembly, or the pressure pump is installed on a pipeline between the first filter water outlet port and the second filter water inlet port.

In one optional embodiment, the filtration component further comprises a first TDS detection sensor and a second TDS detection sensor, the first TDS detection sensor and the second TDS detection sensor are electrically connected to the controller respectively, the first TDS detection sensor is installed on the pipeline between the first filter water outlet port and the second filter water inlet port, the second TDS detection sensor is installed on a pipeline between the first water outlet end and the second water inlet end.

In one optional embodiment, the second filter further comprises a fourth water outlet end, and the bottom of the water tank assembly is equipped with a water tank inlet end and a water tank outlet end, the water tank outlet end is fluidly connected with the first water inlet end, the water tank inlet end is connected to the fourth water outlet end, and a one-way flush valve is installed between the water tank inlet end and the fourth water outlet end; the first water outlet end is further connected to the water tank inlet end, and a one-way solenoid valve that allows only one-way flow is installed between the first water outlet end and the water tank inlet end; the flush valve and the one-way solenoid valve are electrically connected to the controller respectively, the flush valve is configured to flush the first filter, the second filter and to communicate with a pipeline, and to convey filtered wastewater generated by the second filter back to the water tank assembly, the one-way solenoid valve is configured to convey filtered water discharged from the second filter back to the water tank assembly the water tank inlet end during a flushing process of the flush valve.

In one optional embodiment, a first germicidal lamp is arranged on a pipeline connecting the first water inlet end and the water tank assembly, a second germicidal lamp is provided on a pipeline connecting the water outlet nozzle assembly with the other end of the cooling pipeline and the third water outlet end, the first germicidal lamp and the second germicidal lamp are electrically connected to the controller respectively.

In one optional embodiment, a flow meter is provided on the pipeline between the first water outlet end and the second water inlet end, the flow meter is electrically connected to the controller.

In one optional embodiment, the refrigeration module comprises an accommodating cavity and a cooling module; a three-way solenoid valve is further provided on a pipeline connecting the second water inlet end and the first water outlet end; the three-way solenoid valve and the cooling module are both electrically connected to the controller; the three-way solenoid valve comprises a third water inlet end, a fifth water outlet end and a sixth water outlet end; the third water inlet end is connected to the first water outlet end, and the fifth water outlet end is connected to the second water inlet end; the three-way solenoid valve is configured to control an opening or a closing of the third water inlet end, the fifth water outlet end, and the sixth water outlet end according to control commands sent by the controller; a top of the accommodating cavity is provided with an accommodating cavity water inlet port, the sixth water outlet end is connected to the accommodating cavity water inlet port, the cooling pipeline is arranged in the accommodating cavity, the accommodating cavity comprises a water introduced from the accommodating cavity water inlet port and the water used as a cooling medium, the cooling module is configured to cool the water serving as the cooling medium in the accommodating cavity.

In one optional embodiment, the accommodating cavity is further provided with an accommodating cavity liquid level detection sensor, the accommodating cavity liquid level detection sensor is electrically connected to the controller; the accommodating cavity liquid level detection sensor is configured to detect a second liquid level height in the accommodating cavity, and send a second blocking signal to the controller when the second liquid level is higher than a second preset liquid level, the controller is further configured to control the sixth water outlet end to remain in a closed state according to the second blocking signal, the accommodating cavity liquid level detection sensor is further configured to send a connection signal to the controller when the second liquid level height is lower than a third preset liquid level height, the controller is further configured to control the sixth water outlet end to remain in an open state according to the connection signal.

In one optional embodiment, a bottom of the accommodating cavity is provided with a stirring motor, and the stirring motor is electrically connected to the controller; an output end of the stirring motor is provided with a stirring portion, and the stirring portion passes through the bottom of the accommodating cavity and extends into the accommodating cavity.

In one optional embodiment, the accommodating cavity is further provided with a first temperature sensor and a cooling module sensor, the first temperature sensor and the cooling module sensor are both electrically connected to the controller.

In one optional embodiment, the bottom of the accommodating cavity is provided with a cooling medium discharge port.

In one optional embodiment, the cooling module comprises a compressor, a condenser, a cooling fan, a drying filter, a capillary tube and an evaporator pipeline; the evaporator pipeline is arranged in the accommodating cavity, and the compressor and the cooling fan are electrically connected to the controller respectively; a low-pressure pipe inlet port of the compressor is fluidly connected with one end of the evaporator pipeline, a high-pressure pipe outlet port of the compressor is connected to a condenser inlet port, a condenser outlet port is connected to the other end of the evaporator pipeline, the cooling fan is arranged on a back of the condenser, the drying filter and the capillary tube are arranged between the condenser outlet port and the evaporator pipeline.

In one optional embodiment, the water outlet nozzle assembly comprises a second temperature sensor, the second temperature sensor is electrically connected to the controller, the second temperature sensor is configured to detect an actual temperature of the water ultimately discharged from the water purifier.

BRIEF DESCRIPTION OF DRAWINGS

To more clearly illustrate technical solutions in embodiments of the present disclosure, drawings required in the description or prior art are briefly introduced below, and obviously, the drawings in the following description are merely some embodiments of the present disclosure. For a person having ordinary skill in art, other drawings may be obtained according to the drawings without creative efforts.

Figures 1, 2:
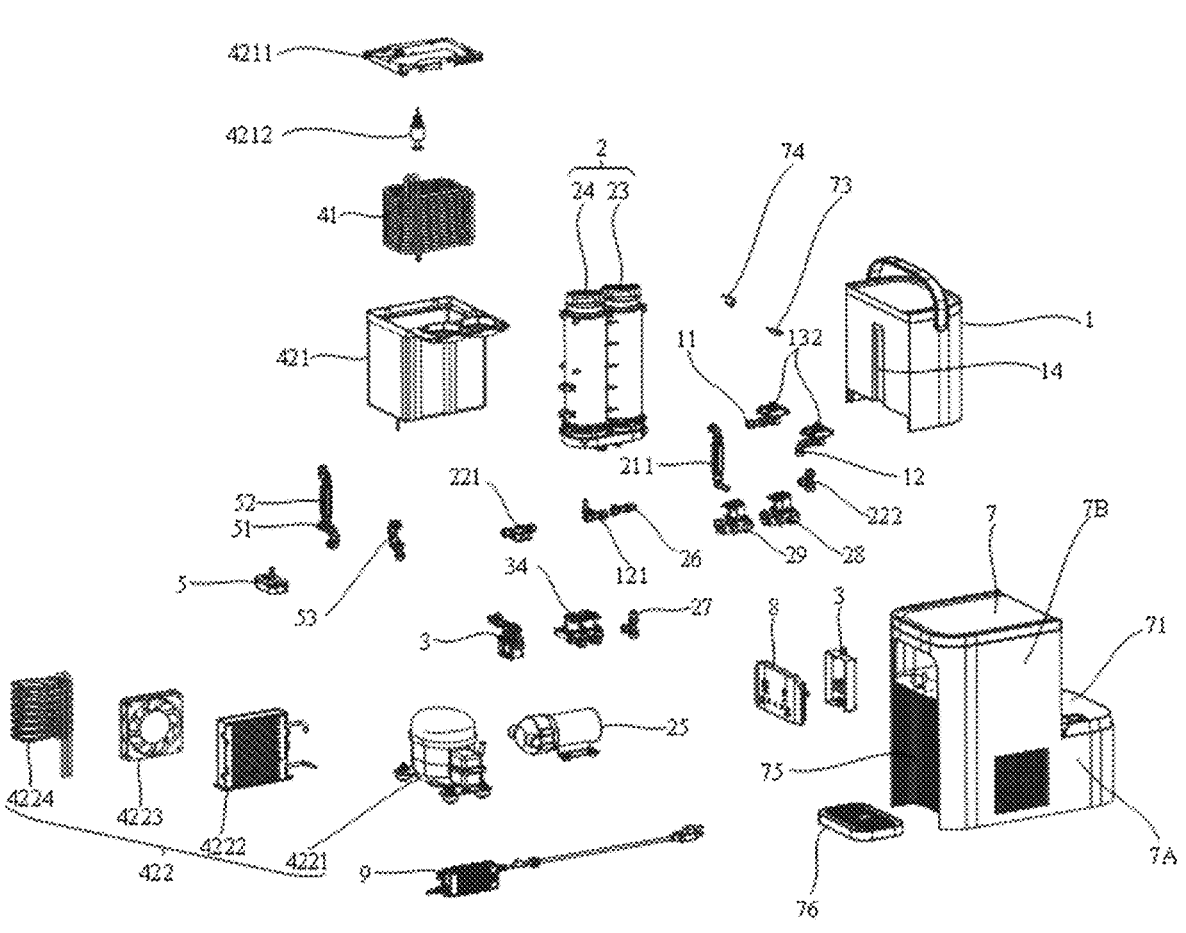
FIG. 1 is a schematic diagram of the structure of a water purifier according to one embodiment of the present disclosure.
FIG. 2 is an exploded view of the water purifier according to one embodiment of the present disclosure.

Reference numbers in the drawings: 1—water tank assembly, 11—water tank water outlet end, 12—water tank water inlet end, 121—second three-way pipe, 131—first automatic closing component, 1311—first sealing ring, 1312—first connecting rod, 13121—first limiting portion, 1313—first spring, 132—second automatic closing component, 1321—mounting bracket, 13211—water passing area, 13212—second through hole, 13213—second inclined surface, 1322—second connecting rod, 13221—second limiting portion, 1323—second sealing ring, 1324—second spring, 133—first through hole, 1331—first inclined surface, 14—slide groove, 15—water tank presence detection magnet, 16—magnetic float, 17—tank body, 171—rib, 18—tank cover, 19—handle, 191—limiting protrusion, 192—mounting hole, 2—filtration component, 21—first water inlet end, 211—first germicidal lamp, 22—first water outlet end, 221—flow meter, 222—third three-way pipe, 23—first filter, 231—first filter water outlet port, 24—second filter, 241—fourth water outlet end, 242—second filter water inlet port, 25—pressure pump, 26—first TDS detection sensor, 27—second TDS detection sensor, 28—flush valve, 29—one-way solenoid valve, 3—reversing valve, 31—second water inlet end, 32—second water outlet end, 33—third water outlet end, 34—three-way solenoid valve, 341—third water inlet end, 342—fifth water outlet end, 343—sixth water outlet end, 4—refrigeration component, 41—cooling pipeline, 42—refrigeration module, 421—accommodating cavity, 4211—accommodating cavity water inlet port, 4212—accommodating cavity liquid level detection sensor, 4213—stirring motor, 4214—first temperature sensor, 4215—cooling module sensor, 4216—insulation layer, 4217—cooling medium discharge port, 4218—extended discharge port, 422—cooling module, 4221—compressor, 4222—condenser, 4223—cooling fan, 4224—evaporator pipeline, 5—water outlet nozzle assembly, 51—first three-way pipe, 52—second germicidal lamp, 53—second temperature sensor, 54—water outlet nozzle status light, 6—controller, 7—housing, 71—installation area, 7A—lower step structure, 7B—higher step structure, 72—slide rail, 73—water tank detector, 74—liquid level sensor, 75—water collection area, 76—water collection tray, 8—operation panel, 9—power module.

DETAILED DESCRIPTION

The following describes embodiments of the technical solutions of the present disclosure in detail about the accompanying drawings. The following embodiments are merely used to clearly describe the technical solutions of the present disclosure and do not intend to limit the protection scope of the present disclosure.

Unless otherwise defined, all technical and scientific terms used herein have the same meaning as commonly understood by those skilled in the art to which the present disclosure belongs. The terminology used herein is to describe particular embodiments only and is not intended to limit the present disclosure; the terms "comprise", "comprise", and any variations thereof in the specification and claims of the present disclosure and the above drawings are intended to cover a non-exclusive inclusion.

In the description of the present disclosure, it should be understood that orientation or positional relationship indicated by terms "length", "width", "upper", "lower", "front", "rear", "left", "right", "vertical", "horizontal", "top", "bottom", "inner", "outer" and so on are based on the orientation or positional relationship shown in the drawings, rather than indicating or implying that an indicated device or an indicated element must have a particular orientation, are constructed and operated in a particular orientation, and are therefore not to be construed as limiting the present disclosure.

In the description of the embodiments of the present disclosure, the technical terms "first", "second", and the like are merely used to distinguish different objects, and cannot be understood as indicating or implying relative importance or implicitly indicating a quantity, a specific order, or a primary and secondary relationship of the indicated technical features.

Reference herein to "embodiment" means that a particular feature, structure, or characteristic described in connection with one embodiment or one implement may be comprised in at least one embodiment of the present disclosure. The appearances of the "embodiment" in various positions in the specification do not necessarily refer to the same embodiment and are not independent or alternative embodiments mutually exclusive of other embodiments. Those skilled in the art explicitly and implicitly understand that the embodiments described herein may be combined with other embodiments.

In addition, it should be noted in the description of the present disclosure that, unless otherwise regulated and defined, terms such as "installation," and "connection" shall be understood in a broad sense, and for example, may refer to fixed connection or detachable connection or integral connection; may refer to mechanical connection or electrical connection; and may refer to direct connection or indirect connection through an intermediate medium or inner communication of two elements. For those of ordinary skill in the art, the meanings of the above terms in the present disclosure may be understood according to concrete conditions.

FIG. 1 is a schematic diagram of the structure of a water purifier according to one embodiment of the present disclosure. As shown in FIGS. 1 to 13, the present disclosure provides a water purifier, the water purifier, comprising: a water tank assembly 1, a filtration component 2, a reversing valve 3, a refrigeration component 4 and a controller 6.

The water tank assembly 1 is configured to store pre-filtration water. For example, the user can add pre-filtration water into the water tank assembly 1. Based on this, a corresponding inlet port can be provided on the water tank assembly 1 for injecting the pre-filtration water into the water tank assembly 1 through an outlet port.

Figure 3:
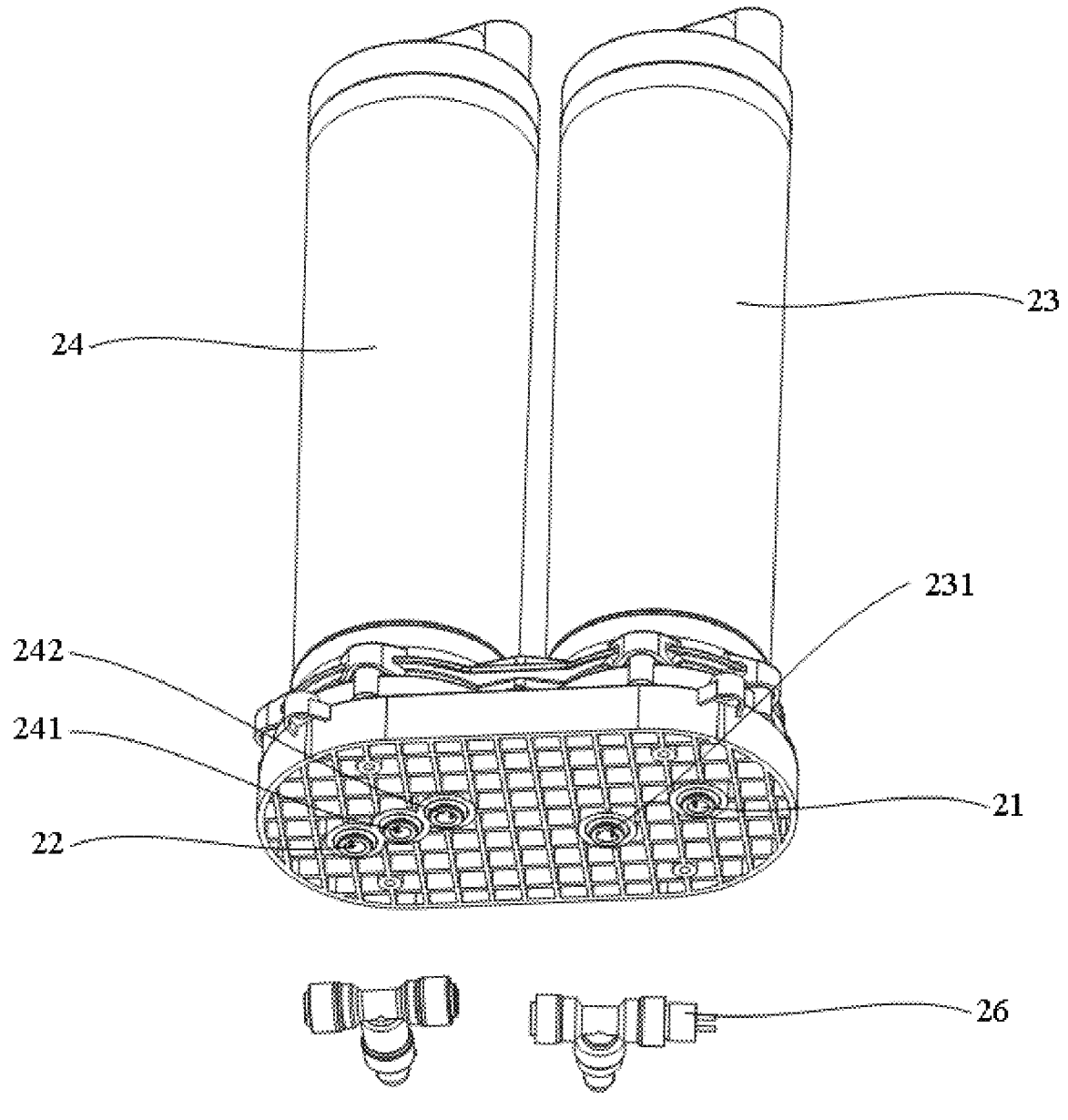
FIG. 3 is a schematic structural diagram of a filtration component of the water purifier according to one embodiment of the present disclosure.
Figure 4:
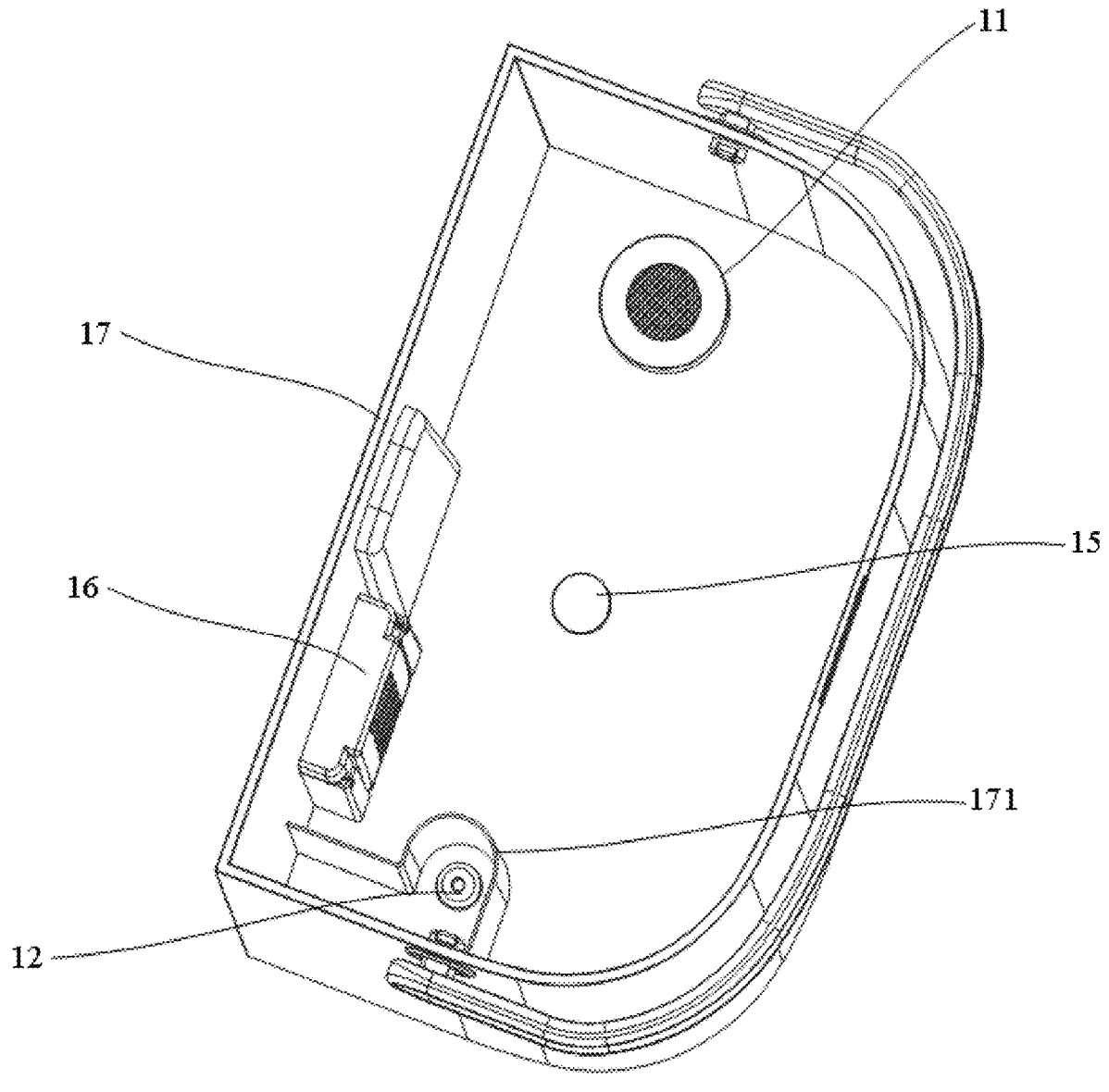
FIG. 4 is a schematic structural diagram of a housing of the water purifier according to one embodiment of the present disclosure.

As shown in FIGS. 3 and 4, the filtration component 2 comprises a first water inlet end 21 and a first water outlet end 22, the first water inlet end 21 is fluidly connected with the water tank assembly 1. Among them, the water tank assembly 1 is provided with a water tank water outlet end 11, and the water tank water outlet end 11 is able to be connected to the first water inlet end 21 through a pipeline, so that the pre-filtration water in the water tank assembly 1 flows through the hose to the filtration component 2 for filtering operation, and then flows out from the first water outlet end 22 of the filtration component 2.

Figure 5:
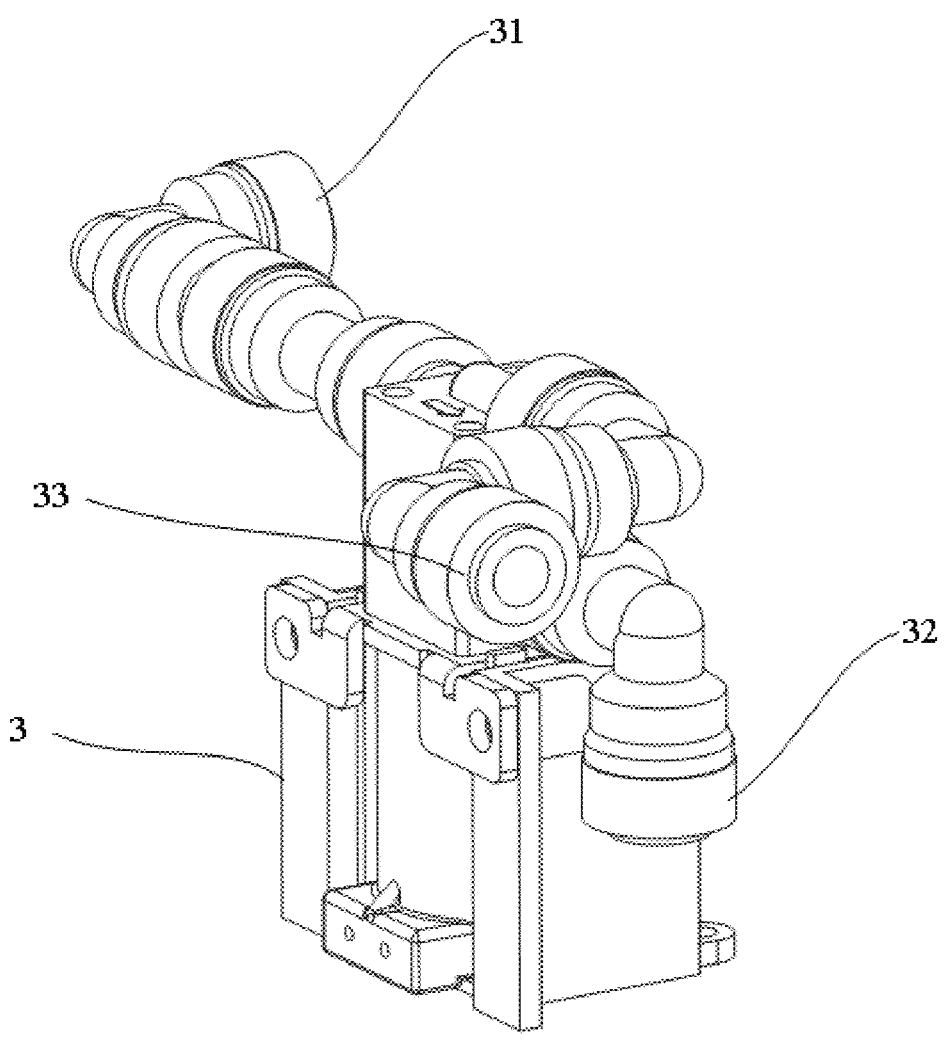
FIG. 5 is a schematic structural diagram of a reversing valve of the water purifier according to one embodiment of the present disclosure.
Figure 6:
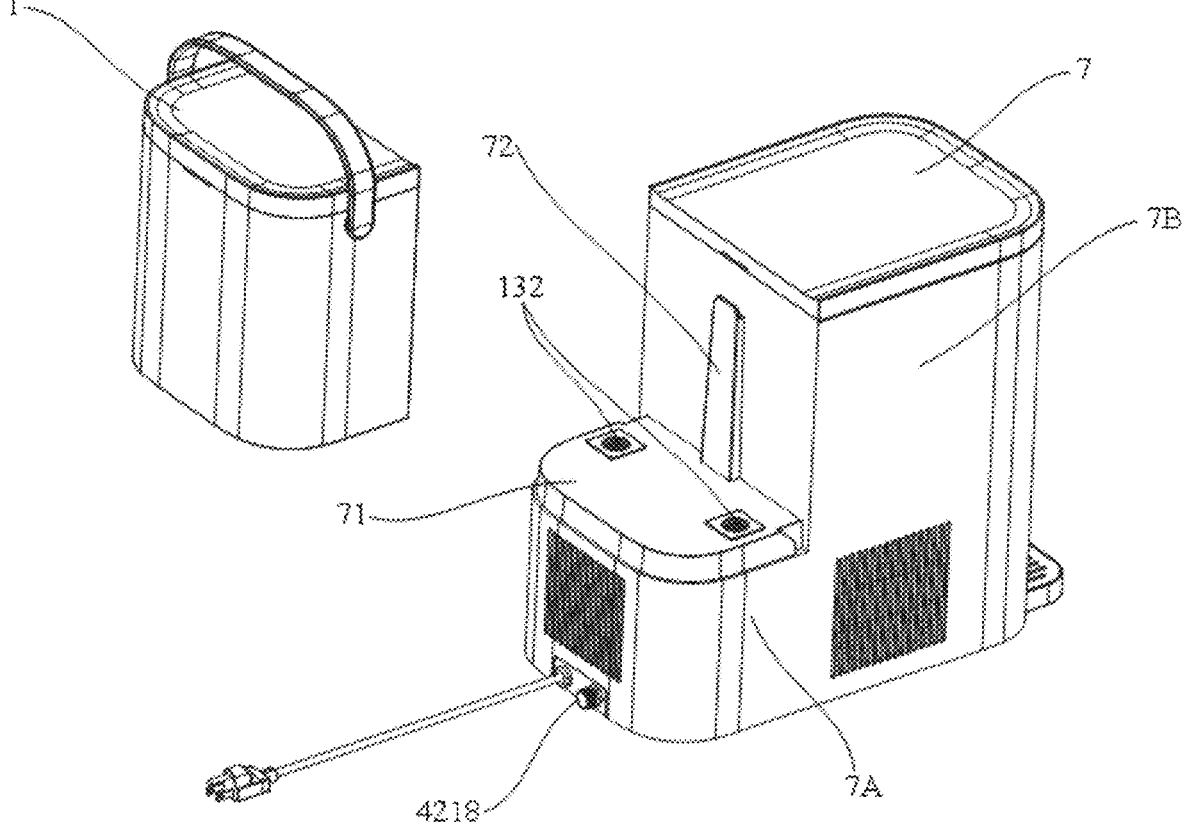
FIG. 6 is another schematic diagram of the structure of the water purifier according to one embodiment of the present disclosure.

Furthermore, as shown in FIG. 5, the reversing valve 3 comprises a second water inlet end 31, a second water outlet end 32 and a third water outlet end 33. The reversing valve 3 is provided with two adjustable channels, which can change the flow direction of the liquid in the valve so that the liquid can flow out from the second water outlet end 32 or the third water outlet end 33. After the filtration component 2 has finished filtering, the pre-filtration water flows into the reversing valve 3 through the second water inlet end 31, and then flows out from the second water outlet end 32 or the third water outlet end 33 of the reversing valve 3.

The refrigeration component 4 comprises a cooling pipeline 41 and a refrigeration module 42 for cooling water in the cooling pipeline 41, one end of the cooling pipeline 41 is connected to the second water outlet end 32. The refrigeration module 42 is used to quickly refrigerate the liquid in the cooling pipeline 41, and one end of the cooling pipeline is connected to the second water outlet end 32 of the reversing valve 3. When the reversing valve 3 opens the second water outlet end 32, the filtered water after being filtered by the filtration component 2 flows into the cooling pipeline 41 through the reversing valve 3 to be cooled, thereby obtaining cooling water.

The water outlet nozzle assembly 5 is connected to the other end of the cooling pipeline 41 and the third water outlet end 33 respectively, so that the cooling water cooled after flowing through the refrigeration component 4 or the normal temperature water without cooling treatment can be obtained. It should be understood that a first three-way pipe 51 is provided between the water outlet nozzle assembly 5, the other end of the cooling pipeline 41, and the third water outlet end 33, and the three ports of the first three-way pipe 51 are respectively connected to the water outlet assembly 5, the other end of the cooling pipeline 41, and the third water outlet end 33.

The controller 6 is electrically connected to the reversing valve 3 and the refrigeration module 42 respectively, the controller 6 is configured to control the second water outlet end 32 and/or the third water outlet end 33 of the reversing valve 3 to be in an open state or a closed state, and to control the refrigeration component 4 to operate.

Figure 13:
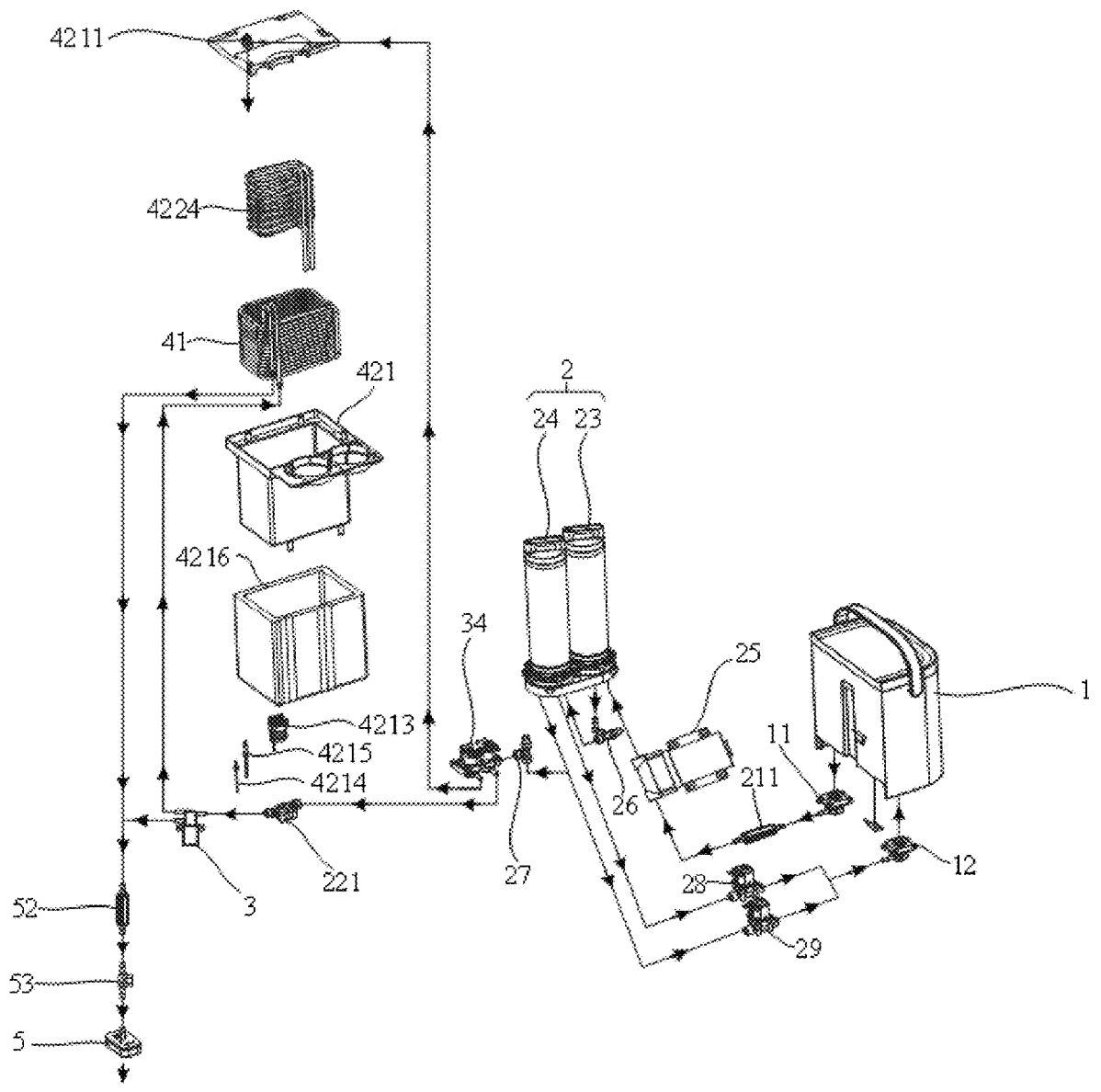
FIG. 13 is a schematic diagram of a water channel structure of the water purifier according to one embodiment of the present disclosure.

Specifically, as shown in FIG. 13, the schematic diagram of the water channel structure, after adding the pre-filtration water into the water tank assembly 1, when the user needs to drink water at room temperature, the controller 6 controls the second water outlet end 32 of the reversing valve 3 to close and the third water outlet end 33 to open, and the pre-filtration water in the water tank assembly 1 enters the filtration component 2 for filtration to obtain filtered water. The filtered water enters the reversing valve 3, and is discharged from the water outlet nozzle assembly 5 after passing through the third water outlet end 33 for the user to drink. When the user needs to drink low-temperature water, the controller 6 controls the second water outlet end 32 of the reversing valve 3 to open and the third water outlet end 33 to close, and the pre-filtration water in the water tank assembly 1 enters the filtration component 2 for filtration to obtain filtered water. The filtered water enters the reversing valve 3 and enters the cooling pipeline 41 through the second water outlet end 32. When the filtered water flows through the cooling pipeline 41, the refrigeration module 42 cools the filtered water in the cooling pipeline 41 to obtain low-temperature water, which is then discharged through the water outlet assembly 5 for users to drink. When the user does not need water, the controller 6 controls the second water outlet end 32 and the third water outlet end 33 to be closed.

The water purifier according to the embodiment of the present invention, the flow direction of the filtered water is controlled by the reversing valve 3, and the filtered water in one of the water channels is cooled by the refrigeration component 4 to obtain low-temperature water, while the other water channel is ambient temperature water. As a result, the water purifier not only has a filtering function, but also a refrigeration function, thereby meeting the user's various drinking needs. Furthermore, the water purifier does not need to be provided with a water storage tank for storing filtered water, so as to prevent the filtered water from being stored for a long time and causing dirt residue, bacteria growth, odor, etc., thereby avoiding the problem of secondary pollution of the filtered water.

Furthermore, in some embodiments, as shown in FIGS. 1 and 2, the water purifier further comprising a housing 7, the housing 7 is provided with an installation area 71, the water tank assembly 1 is detachably arranged in the installation area 71; the filtration component 2, the reversing valve 3, the refrigeration component 4, and the controller 6 are all arranged in the housing 7; the water outlet nozzle assembly 5 is arranged on an outer surface of the housing 7.

Specifically, the housing 7 is arranged in a stepped shape. The installation area 71 is arranged at a lower step structure 7A. The water tank assembly 1 is arranged in the installation area 71, and the top of the water tank assembly 1 is flush with the top of a higher step structure 7B, and the side of the water tank assembly 1 is flush with the side of the housing 7, thereby forming a regular columnar structure with the housing 7, which is aesthetically pleasing and easy to carry. Furthermore, the water tank assembly 1 is detachably arranged in the installation area 71, so that the water tank assembly 1 can be removed from the installation area 71, and the user can remove the water tank assembly 1 and move to the faucet to collect water, or can introduce the water at the faucet into the water tank assembly 1 through a pipeline. A slide groove 14 is arranged on a side wall of the water tank assembly 1 in the vertical direction, and a slide rail 72 matching the slide groove 14 is arranged on a back of the step structure 7B close to the installation area 71 in the vertical direction. When installing the water tank assembly 1, after aligning the slide groove 14 with the slide rail 72, the water tank assembly 1 is slid downward in the vertical direction, and the slide rail 72 slides into the slide groove 14, so as to achieve the purpose of fixing the water tank assembly 1.

Optionally, as shown in FIG. 2, a water tank detector 73 is installed adjacent to a bottom of the water tank assembly 1 in the installation area 71, the water tank detector 73 is configured to detect whether the water tank exists. The water tank detector 73 is electrically connected to the controller 6, a water tank presence detection magnet 15 is installed inside the bottom of the water tank assembly 1, directly facing the water tank detector 73, the water tank detector 73 is configured to send a first blocking signal to the controller 6 when it does not detect a magnetic field signal from the water tank presence detection magnet 15; the controller 6 is further configured to control the second water outlet end 32 and/or the third water outlet end 33 of the reversing valve 3 to be continuously in a closed state according to the first blocking signal. The controller 6 is further configured to control a pressure pump 25 to remain in the closed state according to the blocking signal.

Specifically, the water tank presence detection magnet 15 is set in the water tank assembly 1, and the water tank presence detection magnet 15 generates a magnetic field signal. When the water tank assembly 1 is installed in the installation area 71, the water tank detector 73 installed in the installation area 71 can detect the magnetic field signal generated by the water tank presence detection magnet 15. When the water tank assembly 1 is removed, the water tank detector 73 at the installation area 71 will not be able to detect the magnetic field signal generated by the water tank presence detection magnet 15. At this time, the water tank detector 73 sends a blocking signal to the controller 6. After receiving the blocking signal, the controller 6 controls the second water outlet end 32 and/or the third water outlet end 33 of the reversing valve 3 to remain in a closed state, thereby cutting off the water channel.

Optionally, in order to monitor the total amount of water to be filtered in the water tank assembly 1, a liquid level sensor 74 is installed adjacent to a side wall of the water tank assembly 1 in the installation area 71, the liquid level sensor 74 is electrically connected to the controller 6, a magnetic float 16 is arranged in the water tank assembly 1, the liquid level sensor 74 is configured to confirm a first liquid level height in the water tank assembly 1 according to a magnetic field signal of the magnetic float 16 in the water tank assembly 1, and send the magnetic field signal to the controller 6; the controller 6 is further configured to send a reminder signal when the first liquid level is lower than a first preset liquid level.

Specifically, the magnetic float 16 is provided in the water tank assembly 1, and the magnetic float 16 is located near an inner wall of the water tank assembly 1, and the inner wall is close to the side wall adjacent to the higher step structure 7B and the installation area 71. The magnetic float 16 can float on the surface of the water to be filtered in the water tank assembly 1, and the magnetic float 16 can generate a magnetic field signal. The liquid level sensor 74 is arranged on the side wall adjacent to the higher step structure 7B and the installation area 71. The liquid level sensor 74 can detect the magnetic field signal generated by the magnetic float 16. Because the magnetic float 16 floats on the liquid surface in the water tank assembly 1, the magnetic field signal generated by the magnetic float 16 detected by the liquid level sensor 74 can be detected. The first liquid level in the water tank assembly 1 is confirmed according to the magnetic field signal, and the first liquid level is sent to the controller 6. Then the controller 6 compares the first liquid level with the first preset liquid level to confirm whether the liquid level in the water tank assembly 1 is too low. When the first liquid level is less than or equal to the first preset liquid level, it indicates that the liquid level in the water tank assembly 1 is too low and it is necessary to add filtered water to the water tank assembly 1. Therefore, the controller 6 sends a reminder signal to the outside. When the first liquid level is greater than the first preset liquid level, the controller 6 will not send out a reminder signal. It should be noted that the reminder signal may be a sound signal emitted by a preset speaker, a light flashing signal emitted by a preset indicator light, or a wireless signal sent to the mobile terminal by a preset wireless signal transmitter.

Furthermore, in some embodiments, as shown in FIG. 1 and FIG. 2, the water purifier further comprises a water collection tray 76, the housing 7 is provided with a water collection area 75, and the water collection area 75 is concave; the water outlet nozzle assembly 5 is arranged at a top of the water collection area 75, the water collection tray 76 is arranged at a bottom of the water collection area 75. The water purifier features a detachable design comprising the water collection tray 75 and housing 7, allowing independent maintenance and component replacement . . .

Specifically, in this embodiment, the water collection tray 76 is disposed at a bottom end of the water outlet assembly 5, wherein the water collection tray 76 is slidably engaged with the housing 7 of the water purifier. During water dispensing, a user is configured to place a water container on the water collection tray 76, and the water collection tray 76 is detachably connected to the housing 7 to facilitate cleaning.

Furthermore, in some embodiments, as shown in FIG. 2, the water purifier further comprises an operation panel 8 and a power module 9, the controller 6 is electrically connected to the operation panel 8 and the power module 9 respectively; the operation panel 8 is arranged on the housing 7, the power module 9 is arranged in the housing 7, the operation panel 8 is configured to receive control commands from user's input, the controller 6 is configured to control the second water outlet end 32 and/or the third water outlet end 33 of the reversing valve 3 to be in an open or a closed state according to the control commands, and control the refrigeration component 4 to operate.

Specifically, in order to facilitate the user to operate the water purifier, the water purifier further comprises the operation panel 8, the operation panel 8 is provided with corresponding buttons and a display screen, and the user can input functions through the buttons, for example, choose whether to drink cold or hot water, turn the cooling function on or off, etc. The display screen can be used to display some information, such as time, date, water output adjustment, filter life, whether the water currently discharged is cold water or ambient temperature water, etc. The power module 9 is used to provide 12 V or 24 V low-voltage direct current to the entire internal circuit system of the water purifier.

Figure 7:
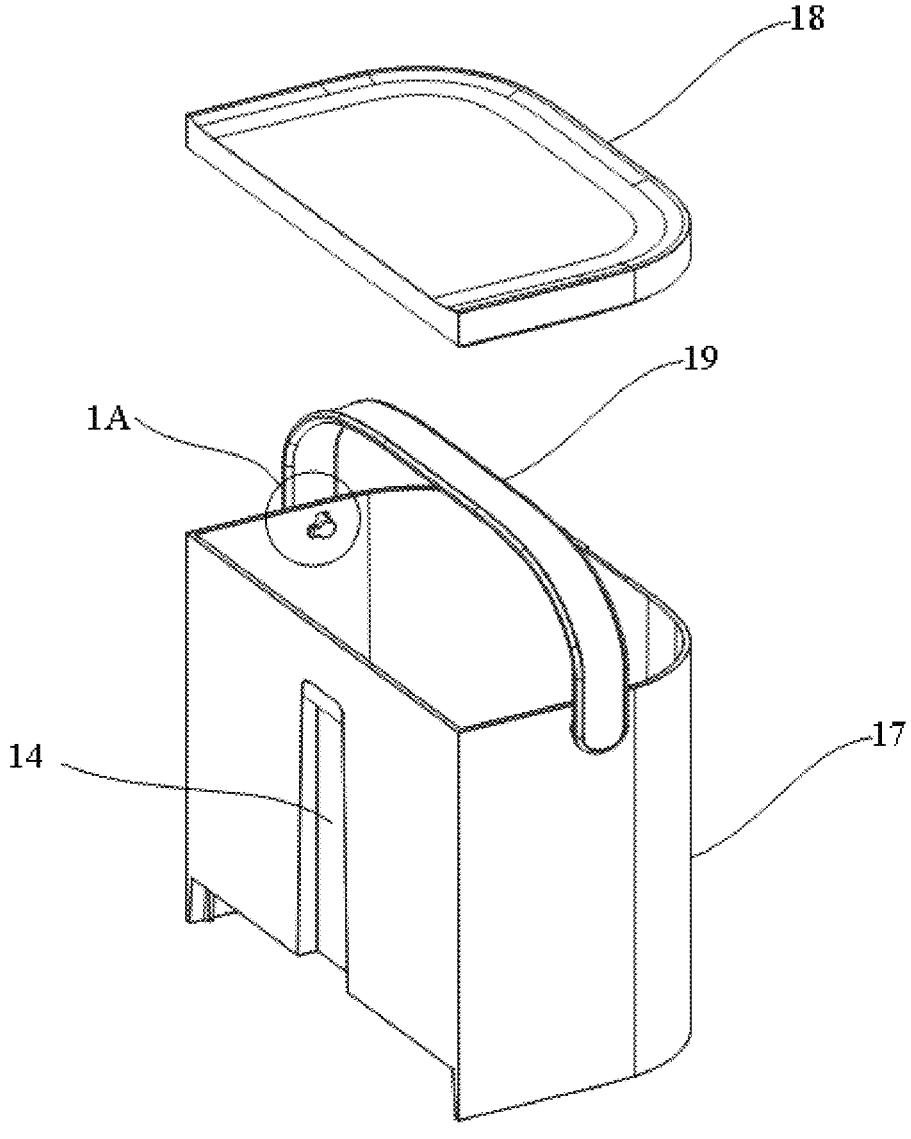
FIG. 7 is a schematic structural diagram of a water tank assembly of the water purifier according to one embodiment of the present disclosure.
Figure 8:
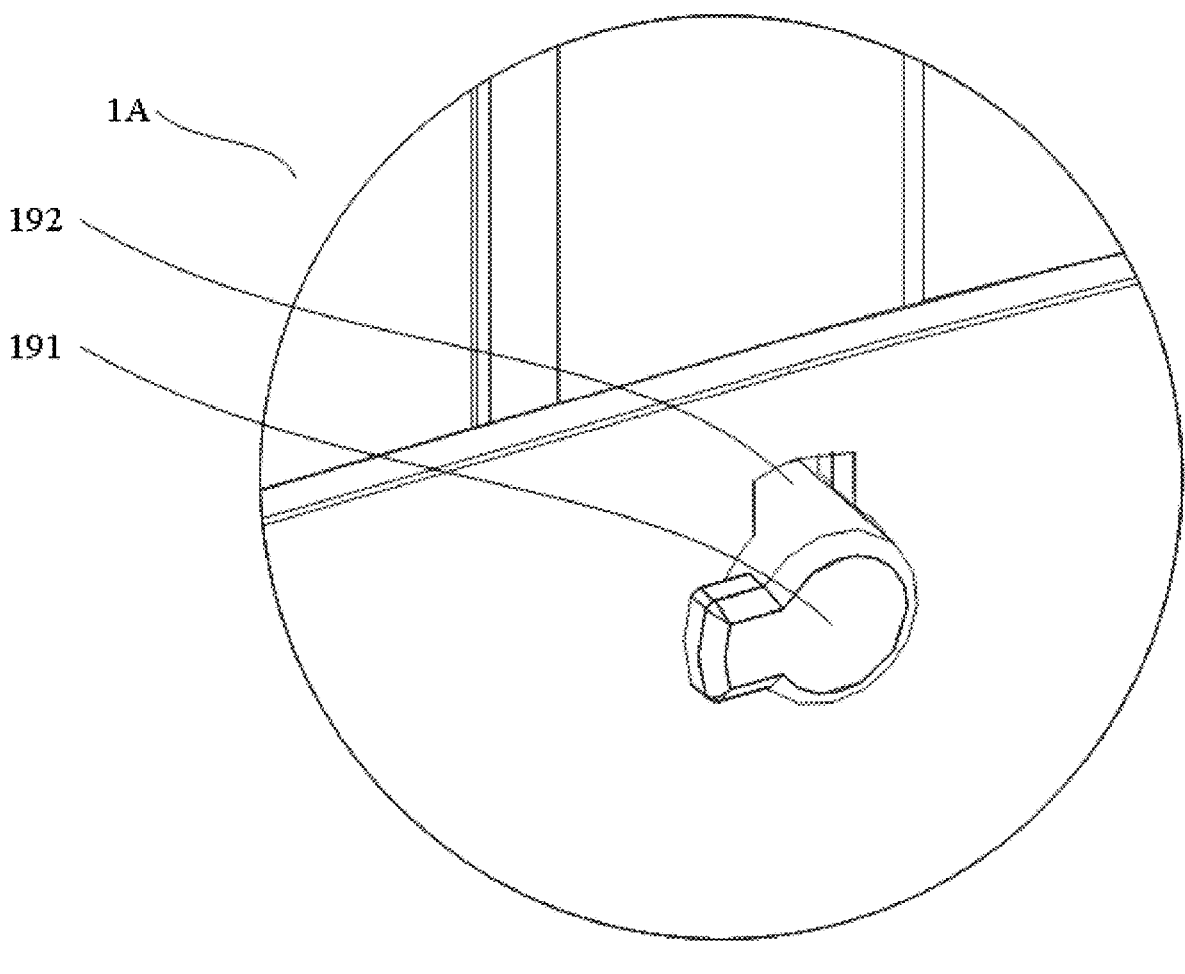
FIG. 8 is a schematic diagram of a partial structure of a water tank assembly of the water purifier according to one embodiment of the present disclosure.
Figure 9:
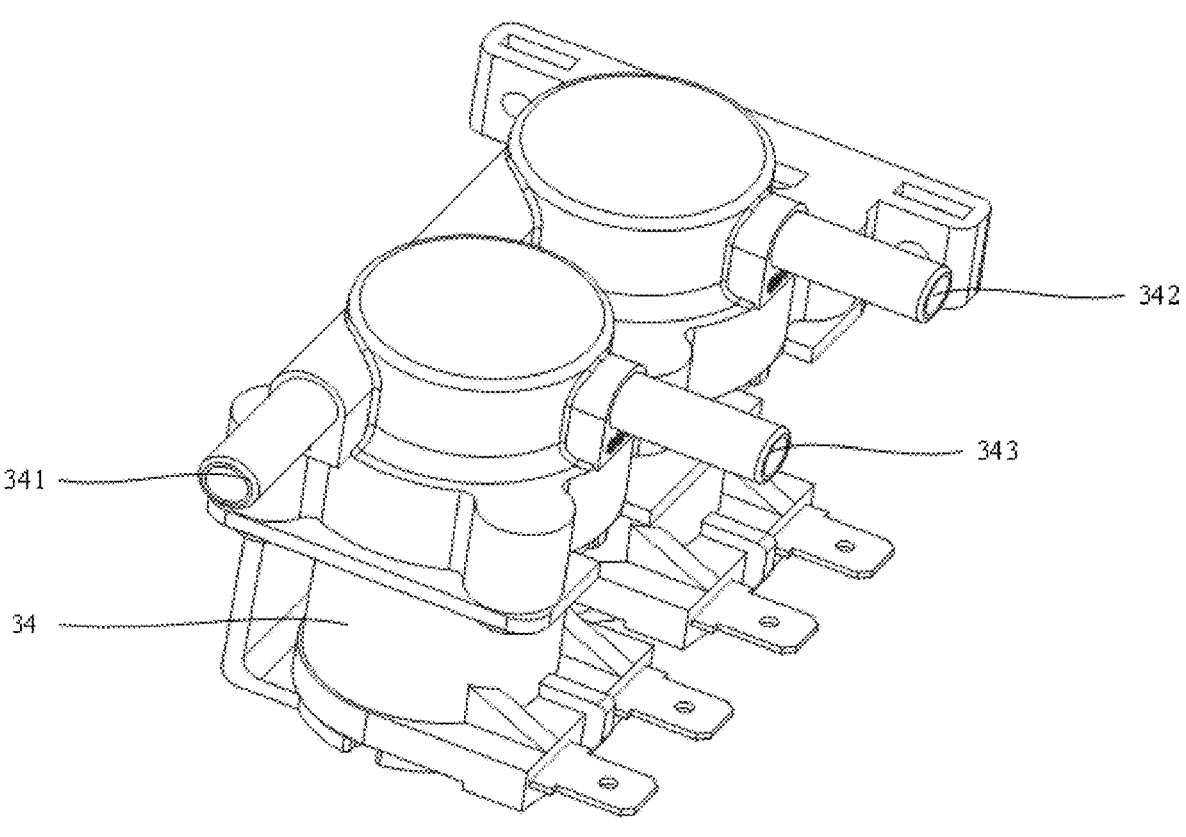
FIG. 9 is a schematic structural diagram of a three-way solenoid valve of a water purifier according to one embodiment of the present disclosure.

Furthermore, in order to facilitate adding the pre-filtration water into the water tank assembly 1, in some embodiments, as shown in FIG. 7, the water tank assembly 1 comprises a tank body 17 and a tank cover 18, a top of the tank body 17 is open, and the tank cover 18 is detachably arranged on the top of the tank body 17.

Specifically, by detachably arranging the tank cover 18 on the tank body 17, when replenishing the water to be filtered into the water tank assembly 1, the tank cover 18 can be completely removed, so that the pre-filtration water can be quickly added to the tank body 17 or directly placed under the faucet to connect tap water.

In order to facilitate the removal of the water tank assembly 1, as shown in FIG. 7, a handle 19 is also provided on the tank body 17. The handle 19 is in the shape of a "Π". Limiting protrusions 191 are provided on the inner walls at both ends of the handle. Mounting holes 192 are provided on the opposite side walls of the top of the water tank assembly 1. The limiting protrusions 191 at both ends of the handle 19 are pivotally mounted within the mounting holes 192. The water tank assembly 1 can be detached from the installation area 71 by lifting the handle 19.

Furthermore, in order to obtain clean and safe filtered water, in some embodiments, as shown in FIG. 2 and FIG. 3, the filtration component 2 comprises a first filter 23 and a second filter 24, the first water inlet end 21 is arranged at the first filter 23, the first water outlet end 22 is arranged at the second filter 24, a first filter water outlet port 231 is fluidly connected with a second filter water inlet port 242.

Specifically, the first filter 23 may be a sediment filter or a combination of a sediment filter and a filter made of other materials (e.g., carbon). The second filter 24 may be a reverse osmosis filter or an ultrafiltration filter, such as a RO reverse osmosis filter, which can remove impurities such as bacteria, viruses, heavy metal ions and most inorganic salts in water, thereby obtaining clean and safe filtered water.

Furthermore, in order to speed up the speed at which the liquid passes through the filtration component 2, so as to quickly obtain a sufficient amount of filtered water, in some embodiments, as shown in FIG. 2, the filtration component 2 further comprises the pressure pump 25, the pressure pump 25 is electrically connected to the controller 6; the pressure pump 25 is installed on a pipeline between the first water inlet end 22 and the water tank assembly 1, or the pressure pump 25 is installed on a pipeline between the first filter water outlet port 231 and the second filter water inlet port 242.

Specifically, the pressure pump 25 is used to apply pressure to the water flowing through the filtration component 2 so that the water passes through the filtration component 2 quickly. It should be noted that the first filter 23 is used to filter larger sediment particles in the water, and the gaps between the filter media are larger, so the water can pass through the first filter 23 at a faster speed; while the second filter 24 is used to filter impurities such as bacteria, viruses, heavy metal ions and most inorganic salts in the water. In the absence of external force, the speed at which water passes through the second filter 24 is relatively slow.

Therefore, in this embodiment, the pressure pump 25 is installed on a pipeline between the first water inlet end 22 and the water tank assembly 1, or the pressure pump 25 is positioned on a pipeline between the first filter water outlet port 231 and the second filter water inlet port 242. It can apply pressure to the water that needs to pass through the second filter 24. The pressure pump 25 is used to increase the water pressure and flow rate so that the water can pass through the second filter 24 smoothly, effectively shortening the water production time and producing a large amount of filtered water more quickly.

Furthermore, in order to verify the cleanliness of the filtered water, in some embodiments, as shown in FIG. 2 and FIG. 3, the filtration component 2 further comprises a first TDS detection sensor 26 and a second TDS detection sensor 27, the first TDS detection sensor 26 and the second TDS detection sensor 27 are electrically connected to the controller 6 respectively, the first TDS detection sensor 26 is installed on the pipeline between the first filter water outlet port 231 and the second filter water inlet port 242, the second TDS detection sensor 27 is installed on a pipeline between the first water outlet end 22 and the second water inlet end 31.

It should be noted that TDS is the Total Dissolved Solids, which refers to the concentration of total dissolved substances in water. The TDS value is generally used to measure the purity of water. In this embodiment, the first TDS detection sensor 26 is used to detect the TDS value of the water filtered by the first filter 23, and it is confirmed according to the first TDS value detected by the first TDS detection sensor 26 whether the TDS concentration of the first filtered water filtered by the first filter 23 is higher than the first preset TDS concentration threshold. If so, it means that the TDS concentration of the first filtered water is too high, and long-term operation and use under high TDS concentration will affect the service life of the second filter 24. Therefore, when the TDS concentration in the first filtered water is too high, a reminder signal will be sent through the controller 6 to remind the user to replace the raw water in time. The second TDS detection sensor 27 is used to detect the TDS value of the water after being filtered by the second filter 24, and it is confirmed according to the second TDS value detected by the second TDS detection sensor 27 whether the TDS concentration of the second filtered water filtered by the second filter 24 is higher than the second preset TDS concentration threshold. If so, it means that the TDS concentration of the second filtered water is too high and is not suitable for users to drink. In addition, it means that the performance of the second filter 24 has declined and needs to be replaced. At this time, the controller 6 sends a reminder signal to remind the user that the current filtered water cannot be drunk, and at the same time reminds the user to replace the second filter 24 to ensure that the filtered water for subsequent drinking is clean and safe.

Furthermore, in order to extend the service life of the filtration component 2 and maintain the cleanliness of the water pipeline, in some embodiments, as shown in FIG. 2, FIG. 3, and FIG. 4, the second filter 24 further comprises a fourth water outlet end 241, and the bottom of the water tank assembly 1 is equipped with a water tank inlet end 12 and a water tank outlet end 11, the water tank outlet end 11 is fluidly connected with the first water inlet end 21, the water tank inlet end 12 is connected to the fourth water outlet end 241, and a one-way flush valve 28 is installed between the water tank inlet end 12 and the fourth water outlet end 241; the first water outlet end 22 is further connected to the water tank inlet end 12, and a one-way solenoid valve 29 that allows only one-way flow is installed between the first water outlet end 22 and the water tank inlet end 12; the flush valve 28 and the one-way solenoid valve 29 are electrically connected to the controller 6 respectively, the flush valve 28 is configured to flush the first filter 23, the second filter 24 and to communicate with a pipeline, and to convey filtered wastewater generated by the second filter 24 back to the water tank assembly 1, the one-way solenoid valve 29 is configured to convey filtered water discharged from the second filter 24 back to the water tank assembly 1 through the water tank inlet end 12 during a flushing process of the flush valve 28.

Specifically, a second three-way pipe 121 is provided between the flush valve 28, the one-way solenoid valve 29 and the water tank inlet end 12, and three interfaces of the second three-way pipe 121 are respectively connected to the flush valve 28, the one-way solenoid valve 29 and the water tank inlet end 12. The flush valve 28 and the one-way solenoid valve 29 are also used to prevent the backflow of sewage used to flush the second filter 24. In addition, the first water outlet end 22, the water tank inlet end 12, and the second water inlet 31 are connected through a third three-way pipe 222.

Figure 14:
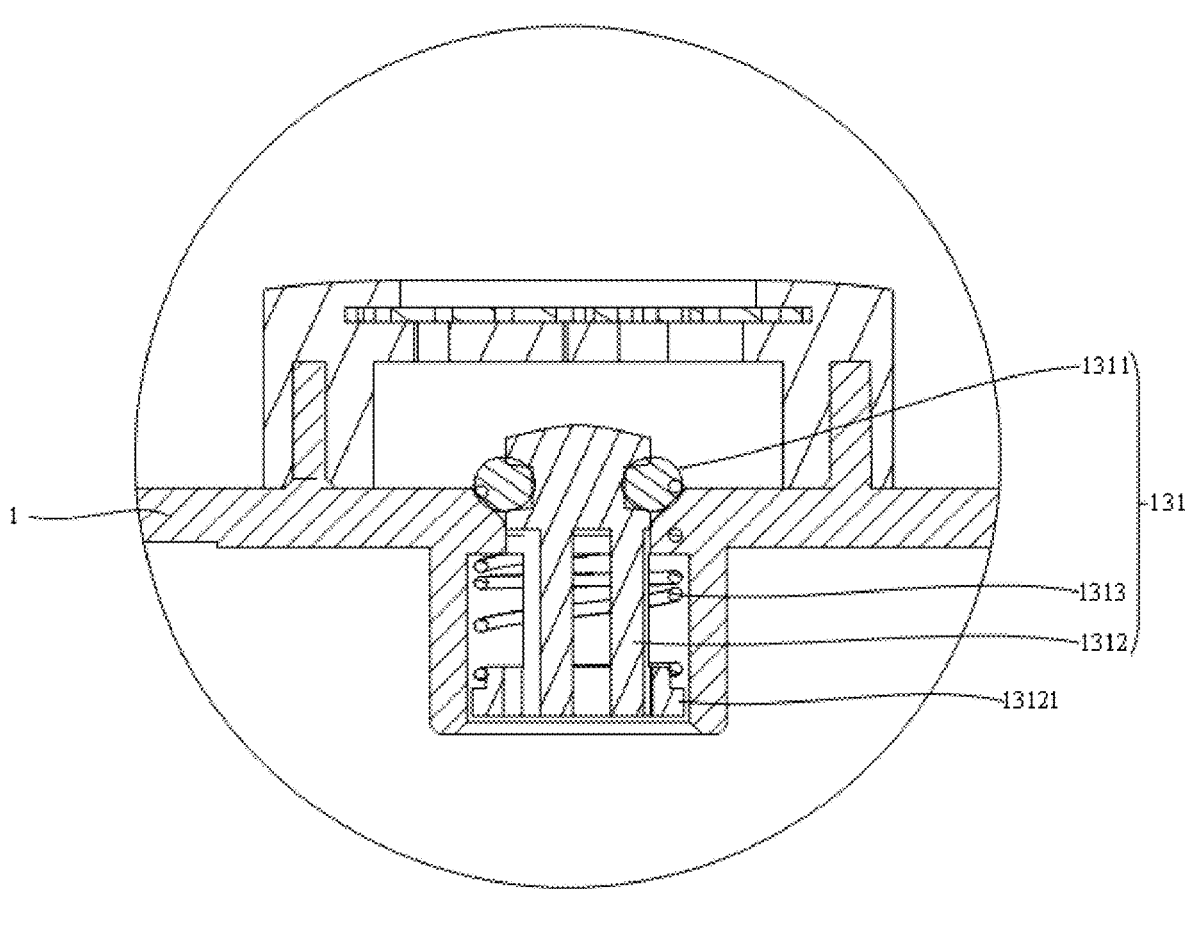
FIG. 14 is a schematic cross-sectional view of a first automatic closing assembly of the water purifier according to one embodiment of the present disclosure.
Figure 15:
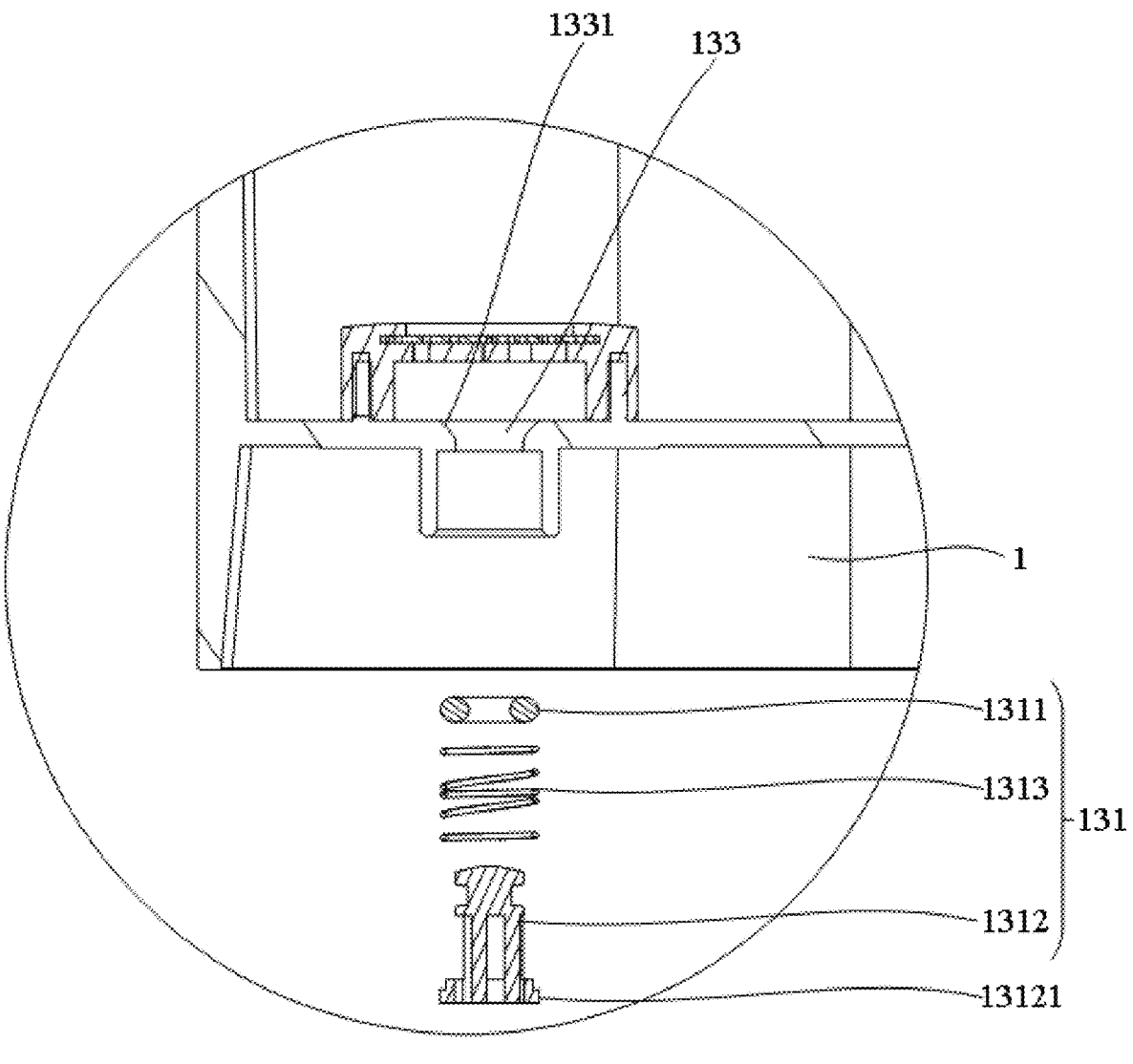
FIG. 15 is an exploded cross-sectional structural diagram of a first automatic closing assembly of the water purifier according to one embodiment of the present disclosure.
Figure 16:
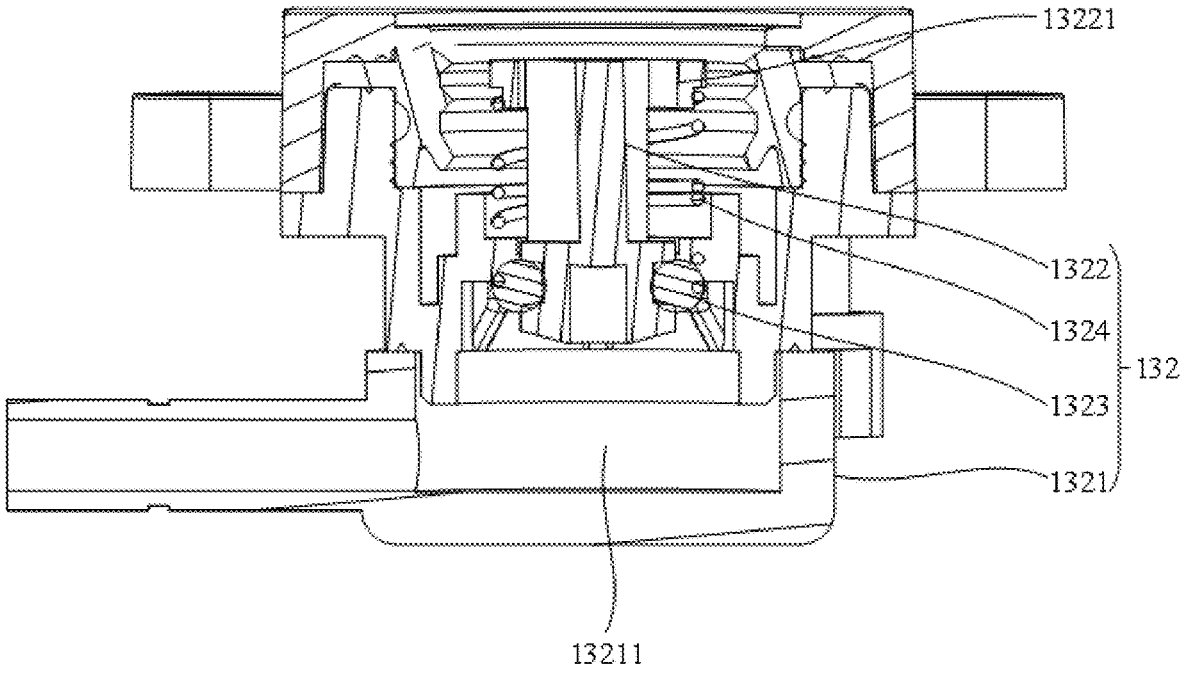
FIG. 16 is a schematic cross-sectional view of a second automatic closing assembly of the water purifier according to one embodiment of the present disclosure.
Figure 17:
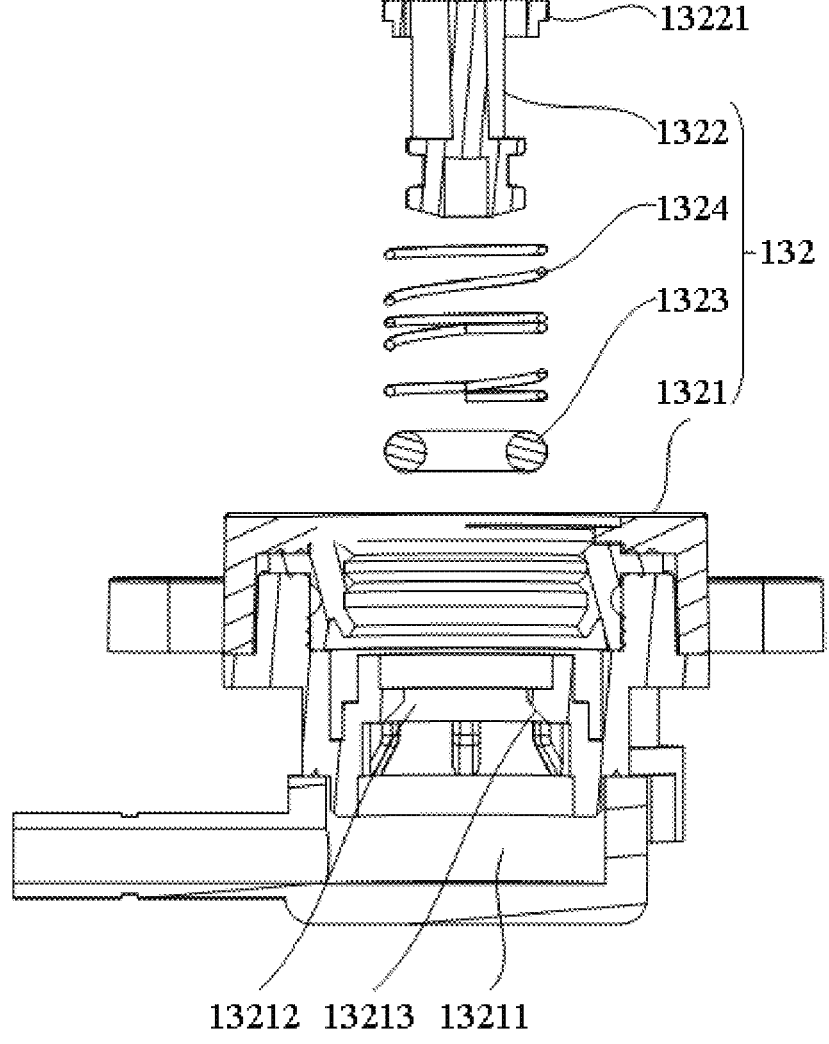
FIG. 17 is a schematic diagram of the exploded cross-sectional structure of the second automatic closing component of the water purifier according to one embodiment of the present disclosure.

In addition, a stainless steel filter screen is provided at the water tank inlet end 12 for preliminary filtration of large particles (sand, hair, large particles, etc.) in the water. The water tank outlet end 11 and the water tank inlet end 12 are both provided with an automatic closing mechanism, which comprises a first automatic closing component 131 (as shown in FIGS. 14 and 15) and a second automatic closing component 132 (as shown in FIGS. 16 and 17). Two first through holes 133 are provided at the bottom of the water tank assembly 1. A diameter of the first through hole 133 is larger at one end close to an inner surface of the water tank assembly 1, and the diameter is smaller at one end close to an outer surface of the water tank assembly, so that an inner wall of the first through hole 133 forms a first inclined surface 1331, and a first automatic closing assembly 131 is provided at each first through hole 133. The first automatic closing assembly 131 comprises a first sealing ring 1311, a first connecting rod 1312 and a first spring 1313. A top end of the first connecting rod 1312 extends into the water tank assembly 1 through the first through hole 133. The first sealing ring 1311 is arranged at the top end of the first connecting rod 1312 and a diameter of the first sealing ring 1311 is greater than the minimum diameter of the first through hole 133. A bottom end of the first connecting rod 1312 extends to an outside of the water tank assembly 1 and is provided with a first limiting portion 13121. The first spring 1313 is sleeved on the first connecting rod 1312, and a top end of the first spring 1313 abuts against an outer surface of the water tank assembly 1, and a bottom end of the first spring 1313 abuts against the first limiting portion 13121. When the first connecting rod 1312 is not subjected to external force, the first spring 1313 exerts an elastic force. Under this force, the first connecting rod 1312 moves outward from the water tank assembly 1. As a result, the first sealing ring 1311 is stuck on the first inclined surface 1331 of the first through hole 133, thereby achieving the purpose of sealing the first through hole 133. Please refer to FIGS. 2, 6, 16 and 17. Two second automatic closing components 132 are arranged at the installation area 71. The second automatic closing components 132 include a mounting bracket 1321, a second connecting rod 1322, a second sealing ring 1323 and a second spring 1324. A water passing area 13211 is arranged in the mounting bracket 1321. The water passing area 13211 is connected to a water outlet or a water inlet communicating with the outside. A second through hole 13212 is arranged on the top of the water passing area 13211. A diameter of the second through hole 13212 close to the water passing area 13211 is larger, and the diameter of the second through hole 13212 away from the water passing area 13211 is smaller, so that an inner wall of the second through hole 13212 forms a second inclined surface 13213. A bottom end of the second connecting rod 1322 passes through the second through hole 13212 and extends to the water passing area 13211. The second sealing ring 1323 is arranged at the bottom end of the second connecting rod 1322. A diameter of the second sealing ring 1323 is larger than a minimum diameter of the second through hole 13212. A top end of the second connecting rod 1322 is provided with a second limiting portion 13221. Two ends of the second spring 1324 abut against an outer surface of the second limiting portion 13221 and the water passing area 13211 respectively. When the second connecting rod 1322 is not subjected to external force, under the elastic action of the second spring 1324, the second connecting rod 1322 moves out of the water passing area 13211, so that the second sealing ring 1323 is stuck on the second inclined surface 13213 of the second through hole 13212, thereby achieving the purpose of sealing the second through hole 13212. Specifically, when the water tank assembly 1 is installed on the installation area 71, the bottom end of the first connecting rod 1312 abuts against the top end of the second connecting rod 1322. Under the interaction force, the first connecting rod 1312 compresses the first spring 1313 to move into the water tank assembly 1, and the first sealing ring 1311 is separated from the first inclined surface 1331 and no longer blocks the first through hole 133; the second connecting rod 1322 compresses the second spring 1324 to move into the water passing area 13211, and the second sealing ring 1323 is separated from the second inclined surface 13213 and no longer blocks the second through hole 13212. The water in the water tank assembly 1 can enter the water passing area 13211 through the first through hole 133 and the second through hole 13212, or the water in the water passing area 13211 can enter the water tank assembly 1 through the second through hole 13212 and the first through hole 133. When the water tank assembly 1 is removed from the installation area 71, the first connecting rod 1312 moves outward from the water tank assembly 1 under the elastic action of the first spring 1313, so that the first sealing ring 1311 is stuck on the first inclined surface 1331 of the first through hole 133 to seal the first through hole 133. Under the elastic action of the second spring 1324, the second connecting rod 1322 moves out of the water passing area 13211, so that the second sealing ring 1323 is stuck on the second inclined surface 13213 of the second through hole 13212, thereby sealing the second through hole 13212. Specifically, as the use time increases, more and more attachments will be deposited on the first filter 23 and the second filter 24, resulting in a decrease in the performance of the first filter 23 and the second filter 24, resulting in a shortened service life of the first filter 23 and the second filter 24. In this embodiment, the flush valve 28 and the one-way solenoid valve 29 are provided, as shown in FIG. 13, when it is necessary to flush the first filter 23 and the second filter 24, the controller 6 controls the reversing valve 3 to be closed, and then opens the flush valve 28 and the one-way solenoid valve 29. After the water in the water tank assembly 1 flows out from the water tank outlet end 11, it enters the first filter 23 from the first water inlet end 21 to flush the first filter 23, and then enters the second filter 24 to flush the second filter 24. The water after flushing the second filter 24 flows out from the first water outlet end 22 and the fourth water outlet end 241 respectively. The water flowing out from the first water outlet end 22 flows back into the water tank assembly 1 after passing through the one-way solenoid valve 29, and the water flowing out from the fourth water outlet end 241 flows back into the water tank assembly 1 after passing through the flush valve 28.

In addition, when the first TDS detection sensor 26 and/or the second TDS detection sensor 27 detects that the first filtered water and/or the second filtered water does not meet the preset TDS concentration threshold requirement, a reminder signal is sent to the controller 6, and the controller 6 controls the flushing valve 28 and the one-way solenoid valve 29 to operate to flush the first filter 23 and the second filter 24.

In this embodiment, the flush valve 28 and the one-way solenoid valve 29 are provided to flush the first filter 23 and the second filter 24, thereby extending the service life of the first filter 23 and the second filter 24. Furthermore, the wastewater used for flushing the first filter 23 and the second filter 24 can be almost completely recovered and recycled, thereby avoiding wasting water resources and improving the utilization rate of water resources.

Furthermore, as shown in FIG. 4, a rib 171 surrounding the water tank inlet end 12 is disposed at the bottom of the water tank assembly 1.

Specifically, by setting the rib 171 around the water tank inlet end 12 in the water tank assembly 1, a semi-isolated state is formed between the area where the water tank inlet end 12 is located and other areas in the water tank assembly 1. To a certain extent, impurities in the wastewater recovered from the water tank inlet end 12 can be precipitated in the area surrounded by the rib 171, thereby avoiding excessive deterioration of the water quality of the original water due to excessive mixing of the recovered wastewater with the original water in the water tank assembly 1.

Furthermore, in order to improve the cleanliness of water, as shown in FIG. 2, a first germicidal lamp 211 is arranged on a pipeline connecting the first water inlet end 21 and the water tank assembly 1, a second germicidal lamp 52 is provided on a pipeline connecting the water outlet nozzle assembly 5 with the other end of the cooling pipeline and the third water outlet end 33, the first germicidal lamp 211 and the second germicidal lamp 52 are electrically connected to the controller 6 respectively.

Specifically, by arranging the first germicidal lamp 211 on the pipeline connecting the first water inlet end 21 and the water tank assembly 1, the first germicidal lamp 211 is used to preliminarily sterilize the water to be filtered flowing out of the water tank assembly 1, thereby reducing bacteria and viruses in the water entering the filtration component 2. By arranging the second germicidal lamp 52 on the pipeline connecting the water outlet assembly 5 with the other end of the cooling pipeline and the third water outlet end 33, the second germicidal lamp 52 is used to sterilize the filtered water flowing out from the other end of the cooling pipeline or the third water outlet end 33, thereby ensuring the cleanliness and safety of the filtered water for users to drink. Preferably, the first germicidal lamp 211 and the second germicidal lamp 52 are ultraviolet germicidal lamps.

Furthermore, in order to facilitate the user to quantitatively drink water or quantitatively take water, in some embodiments, as shown in FIG. 2, a flow meter 221 is provided on the pipeline between the first water outlet end 22 and the second water inlet end 31, the flow meter 221 is electrically connected to the controller 6.

Specifically, the flow meter 221 is arranged between the filtration component 2 and the reversing valve 3, and the water output is counted by the flow meter 221. The flow meter 221 is electrically connected to the controller 6, and the flow rate counted by the flow meter 221 in real time can be sent to the controller 6, and then output to the outside by the controller 6. For example, the controller 6 outputs and displays the flow data in real time through a preset display screen; the controller 6 can also accumulate the flow data to achieve the purpose of calculating the service life of the filter. If the accumulated flow data reaches the preset service life of the filter, the controller 6 sends a reminder signal to the display screen for display, accompanied by a horn reminder sound.

Furthermore, in some embodiments, as shown in FIG. 1, FIG. 2, FIG. 9 and FIG. 10, the refrigeration module 42 comprises a three-way solenoid valve 34, an accommodating cavity 421 and a cooling module 422; a three-way solenoid valve 34 is further provided on a pipeline connecting the second water inlet end 31 and the first water outlet end 22; the three-way solenoid valve 34 and the cooling module 422 are both electrically connected to the controller 6; the three-way solenoid valve 34 comprises a third water inlet end 341, a fifth water outlet end 342 and a sixth water outlet end 343; the third water inlet end 341 is connected to the first water outlet end 22, and the fifth water outlet end 342 is connected to the second water inlet end 31; the three-way solenoid valve 34 is configured to to switch flow channel between the third water inlet end 341, the fifth water outlet end 342 and the sixth water outlet end 343 under commands from the controller 6; a top of the accommodating cavity 421 is provided with an accommodating cavity water inlet port 4211, the sixth water outlet end 343 is connected to the accommodating cavity water inlet port 4211, the cooling pipeline 41 is arranged in the accommodating cavity 421, the accommodating cavity 421 is filled with water introduced from the accommodating cavity water inlet port 4211 and the water used as a cooling medium, the cooling module 422 is configured to cool the water serving as the cooling medium in the accommodating cavity 421.

In order to improve the cooling effect of the cooling medium in the accommodating cavity 421 on the filtered water in the cooling pipeline 41, the cooling pipeline 41 adopts a multi-layer spiral elbow structure to increase the contact area between the cooling pipeline 41 and the cooling medium in the accommodating cavity 421, thereby improving the cooling effect of the cooling medium in the accommodating cavity 421 on the cooling pipeline 41.

Specifically, when the user needs to access low-temperature water, as shown in FIG. 13, the controller 6 controls the fifth water outlet end 342 of the three-way solenoid valve 34 to open and the sixth water outlet end 343 to close, and controls the second water outlet end 32 of the reversing valve 3 to open and the third water outlet end 33 to close. After the filtered water is discharged from the filtration component 2, it enters the three-way solenoid valve 34 from the third water inlet end 341, and then is discharged from the fifth water outlet end 342, enters the reversing valve 3 from the second water inlet end 31, and then is discharged from the second water outlet end 32, enters the cooling pipeline 41 from one end of the cooling pipeline 41, and after cooling in the cooling pipeline 41, is discharged from the other end of the cooling pipeline 41, enters the water outlet nozzle assembly 5, and is finally discharged from the water outlet nozzle assembly 5 to the outside for the user to receive. When the user needs to collect water at room temperature, as shown in FIG. 13, the controller 6 controls the fifth water outlet end 342 of the three-way solenoid valve 34 to open and the sixth water outlet end 343 to close, and controls the second water outlet end 32 of the reversing valve 3 to close and the third water outlet end 33 to open. After the filtered water is discharged from the filtration component 2, it enters the three-way solenoid valve 34 from the third water inlet end 341, and then is discharged from the fifth water outlet end 342, enters the reversing valve 3 from the second water inlet end 31, and then is discharged from the third water outlet end 33, enters the water outlet nozzle assembly 5, and is finally discharged from the water outlet nozzle assembly 5 to the outside for the user to collect. In this embodiment, filtered water is used as the cooling medium in the refrigeration component 4, so there is no need to configure an additional cooling medium.

In addition, in order to conveniently add water as a cooling medium into the accommodating cavity 421, the top of the accommodating cavity 421 is provided with the accommodating cavity water inlet port 4211, and the accommodating cavity water inlet port 4211 is fluidly connected with the sixth water outlet end 343. Upon a requirement to add water into the accommodating cavity 421, the controller 6 controls the fifth water outlet end 342 of the three-way solenoid valve 34 to close and the sixth water outlet end 343 to open. After the filtered water is discharged from the filtration component 2, it enters the three-way solenoid valve 34 from the third water inlet end 341, and then is discharged from the sixth water outlet end 343, and then enters the accommodating cavity 421 from the accommodating cavity water inlet port 4211. Furthermore, the water inlet pipeline of the accommodating cavity 421 is separated from the pipeline of the user's drinking water, and there is no problem of the water in the accommodating cavity 421 contaminating the filtered water.

Figure 10:
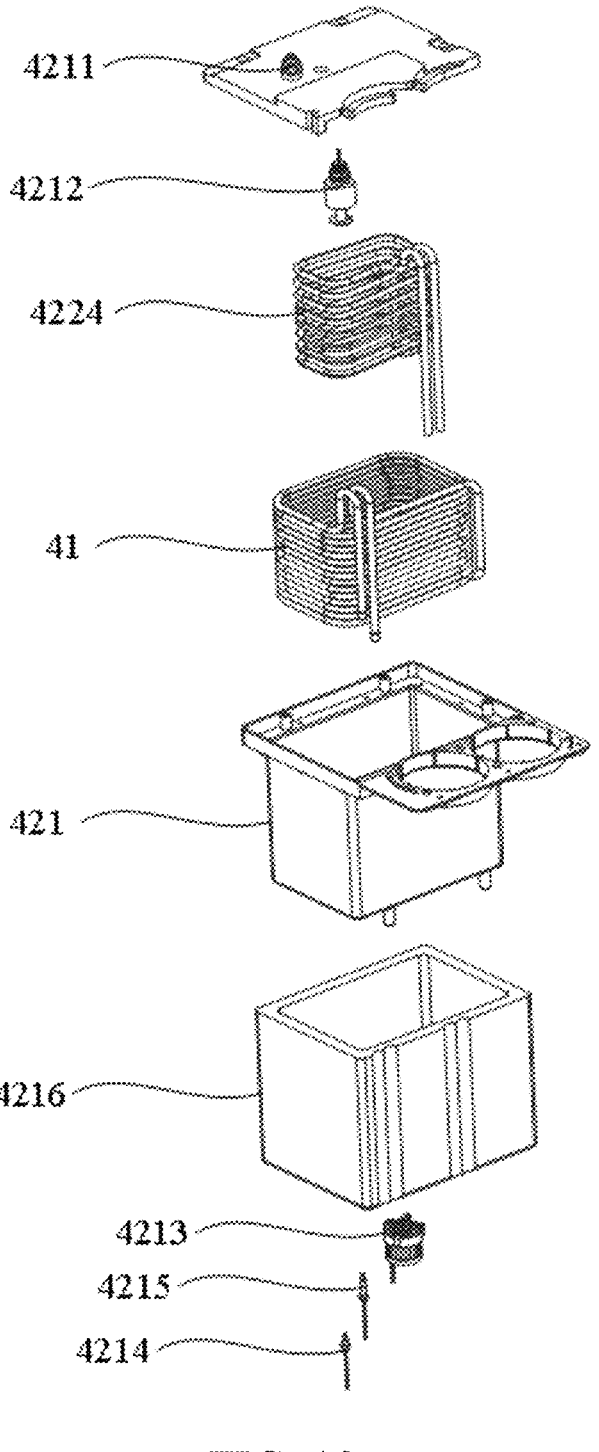
FIG. 10 is a schematic diagram of the exploded structure of the accommodating cavity of the water purifier according to one embodiment of the present disclosure.

Furthermore, in order to ensure that there is enough water in the accommodating cavity 421 as the cooling medium to ensure the cooling effect, in some embodiments, as shown in FIG. 2 and FIG. 10, the accommodating cavity 421 is further provided with an accommodating cavity liquid level detection sensor 4212, the accommodating cavity liquid level detection sensor 4212 is electrically connected to the controller 6; the accommodating cavity liquid level detection sensor 4212 is configured to detect a second liquid level height in the accommodating cavity 421, and send a second blocking signal to the controller 6 when the second liquid level is higher than a second preset liquid level, the controller 6 is further configured to control the sixth water outlet end 343 to remain in a closed state according to the second blocking signal, the accommodating cavity liquid level detection sensor 4212 is further configured to send a connection signal to the controller 6 when the second liquid level height is lower than a third preset liquid level height, the controller 6 is further configured to control the sixth water outlet end 343 to remain in an open state according to the connection signal.

Specifically, the second preset liquid level and the third preset liquid level are preset. When the liquid level in the accommodating cavity 421 is higher than the second preset liquid level, it indicates that there is too much cooling medium in the accommodating cavity 421, and it is necessary to stop injecting cooling medium into the accommodating cavity 421. When the liquid level in the accommodating cavity 421 is lower than the third preset liquid level, it means that the cooling medium in the accommodating cavity 421 cannot completely immerse the cooling pipeline 41. By configuring the accommodating cavity liquid level detection sensor 4212 in the accommodating cavity 421, the second liquid level height in the accommodating cavity 421 is obtained by using the accommodating cavity liquid level detection sensor 4212 and sent to the controller 6. When the controller 6 confirms that the second liquid level height is lower than the third preset liquid level height, the fifth water outlet end 342 of the three-way solenoid valve 34 is controlled to close and the sixth water outlet end 343 is opened, and the cooling medium begins to be added to the accommodating cavity 421. When the second liquid level in the accommodating cavity 421 is higher than the second preset liquid level, the controller 6 controls the fifth water outlet end 342 of the three-way solenoid valve 34 to open and the sixth water outlet end 343 to close, and stops adding cooling medium into the accommodating cavity 421, thereby achieving the purpose of automatically adding cooling medium into the accommodating cavity 421.

Furthermore, in order to evenly cool the cooling medium in the accommodating cavity 421, in some embodiments, as shown in FIG. 10, a bottom of the accommodating cavity 421 is provided with a stirring motor 4213, and the stirring motor 4213 is electrically connected to the controller 6; an output end of the stirring motor 4213 is provided with a stirring portion, and the stirring portion passes through the bottom of the accommodating cavity 421 and extends into the accommodating cavity 421.

Specifically, when the refrigeration module 422 cools the cooling medium in the accommodating cavity 421, the stirring motor 4213 is controlled to start working, and the stirring motor 4213 stirs the cooling medium in the accommodating cavity 421 to make the cooling medium in the accommodating cavity 421 flow, so that the cooling medium in the accommodating cavity 421 can be evenly cooled.

Furthermore, in order to achieve more intelligent control, the accommodating cavity 421 is further provided with a first temperature sensor 4214 and a cooling module sensor 4215, the first temperature sensor 4214 and the cooling module sensor 4215 are both electrically connected to the controller 6.

Specifically, the first temperature sensor 4214 is used to detect the temperature of the water in the accommodating cavity 421 and send it to the controller 6. The controller 6 compares the temperature of the cooling medium in the accommodating cavity 421 with the temperature preset by the user. When the temperature of the cooling medium in the accommodating cavity 421 is higher than the temperature preset by the user, the controller 6 controls the cooling module 422 to work so as to reduce the temperature of the cooling medium in the accommodating cavity 421. When the temperature of the cooling medium in the accommodating cavity 421 is lower than the temperature preset by the user, the controller 6 controls the cooling module 422 to stop working to save electricity. The cooling module sensor 4215 is used to detect whether the cooling module 422 is working normally.

Furthermore, in order to save electricity, in some embodiments, as shown in FIG. 10, the outer wall of the accommodating cavity 421 is provided with an insulation layer 4216.

Specifically, by setting the insulation layer 4216 on the outside of the accommodating cavity 421, when the temperature of the cooling medium in the accommodating cavity 421 is lowered, under the action of the insulation layer 4216, the temperature of the cooling medium in the accommodating cavity 421 can continue to maintain a low temperature state, thereby reducing the working time of the cooling module 422, thereby achieving the purpose of saving electricity.

Figure 11:
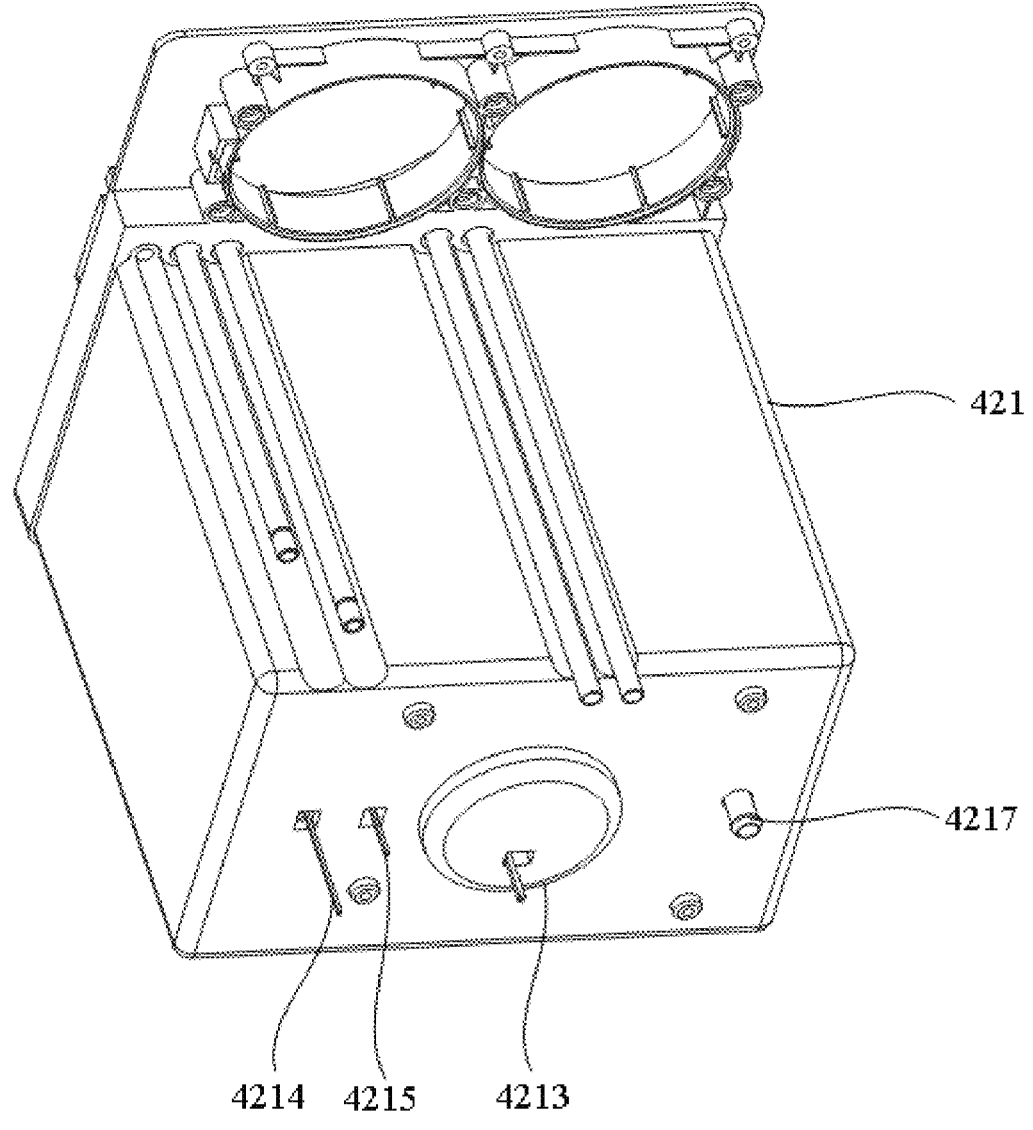
FIG. 11 is a schematic diagram of a bottom structure of the accommodating cavity of the water purifier according to one embodiment of the present disclosure.
Figure 12:
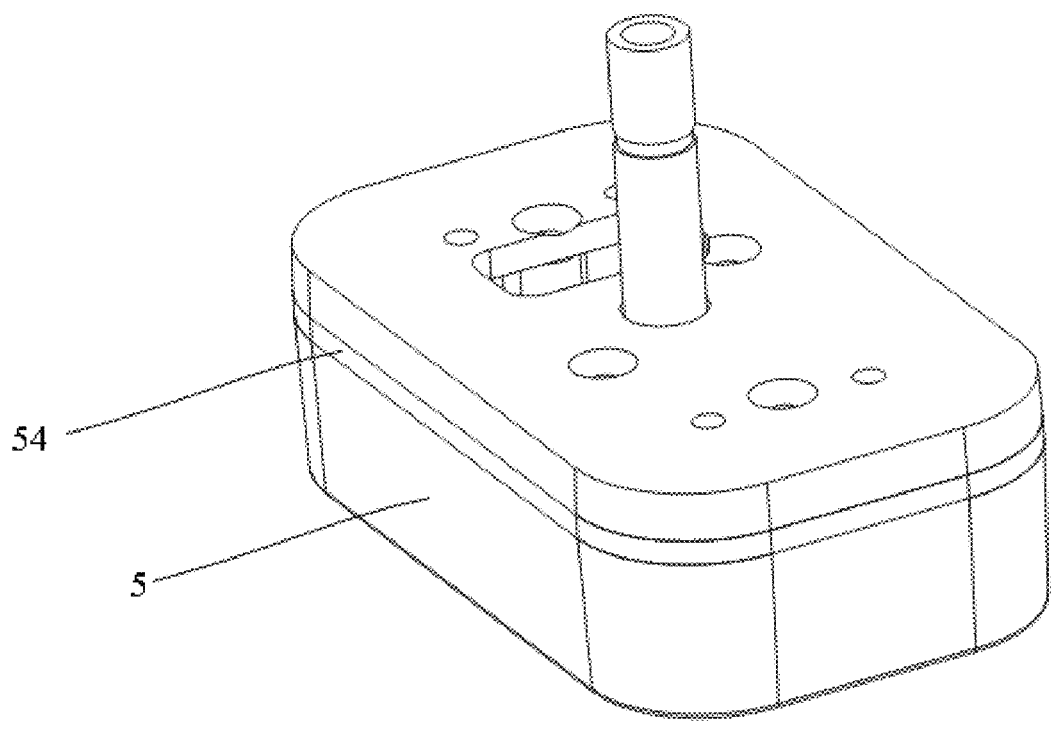
FIG. 12 is a schematic diagram of a structure of the water outlet nozzle assembly of the water purifier according to one embodiment of the present disclosure.

Furthermore, in some embodiments, as shown in FIG. 11, the bottom of the accommodating cavity 421 is provided with a cooling medium discharge port 4217.

Specifically, when the water purifier needs to be moved, in order to prevent the cooling medium in the accommodating cavity 421 from spilling out and damaging the water purifier, the bottom of the accommodating cavity 421 is further provided with the cooling medium discharge port 4217. Before the accommodating cavity 421 is moved, the cooling medium in the accommodating cavity 421 may be discharged through the cooling medium discharge port 4217. Specifically, please refer to FIG. 6, the cooling medium discharge port 4217 extends to the outside of the housing 7 through the hose pipeline to form an extended discharge port 4218.

Furthermore, in some embodiments, as shown in FIG. 2, the cooling module 422 comprises a compressor 4221, a condenser 4222, a cooling fan 4223, a drying filter, a capillary tube and an evaporator pipeline 4224; the compressor 4221 and the cooling fan 4223 are electrically connected to the controller 6 respectively; a low-pressure pipe inlet port of the compressor 4221 is fluidly connected with one end of the evaporator pipeline 4224, a high-pressure pipe outlet port of the compressor 4221 is connected to a condenser inlet port 4222, a condenser outlet port 4222 is connected to the other end of the evaporator pipeline 4224, the cooling fan 4223 is arranged on a back of the condenser 4222, the drying filter and the capillary tube are arranged between the condenser outlet port 4222 and the evaporator pipeline 4224. Among them, in order to improve the cooling effect of the evaporator pipeline 4224 on the water in the accommodating cavity 421, the evaporator pipeline 4224 adopts a multi-layer spiral bent pipeline structure, thereby greatly increasing the contact area between the evaporator pipeline 4224 and the cooling medium in the accommodating cavity 421, thereby improving the cooling effect of the evaporator pipeline 4224 on the cooling medium in the accommodating cavity 421.

Specifically, the compressor 4221 sucks low-pressure and low-temperature refrigerant gas from the evaporator pipeline 4224, compresses it into high-temperature and high-pressure refrigerant gas, and then sends it to the condenser 4222. In the condenser 4222, the cooling fan 4223 starts to work, driving the air flow and achieving heat exchange with the air, thereby achieving heat dissipation and cooling of the condenser 4222. The refrigerant gas in the condenser 4222 dissipates a large amount of heat and condenses into liquid. The moisture and impurities in the refrigerant are filtered out through a drying filter (not shown in the figure) and then sent into a capillary tube (not shown in the figure). The capillary tube has a decompression and throttling effect on the refrigerant liquid, which reduces the pressure and flow rate of the refrigerant liquid, and the temperature also decreases accordingly. Finally, after the refrigerant enters the evaporator pipeline 4224, it evaporates quickly and absorbs heat to become gas, thereby absorbing the heat of the cooling medium in the accommodating cavity 421, thereby achieving the purpose of cooling the cooling medium in the accommodating cavity 421. This process is repeated in the closed cooling module 422, which continuously absorbs the heat of the cooling medium in the accommodating cavity 421 and discharges it into the air until the temperature of the cooling medium in the accommodating cavity 421 reaches the required predetermined temperature.

Furthermore, in order to facilitate the user to accurately know the temperature of the water to be drunk, in some embodiments, as shown in FIG. 2, the water outlet nozzle assembly 5 comprises a second temperature sensor 53, the second temperature sensor 53 is electrically connected to the controller 6.

Specifically, the second temperature sensor 53 is used to measure the temperature of the water to be discharged from the water outlet nozzle assembly 5 and feed it back to the controller, and the controller can output and display the temperature of the water through a preset display screen.

In addition, as shown in FIG. 13, the water outlet nozzle assembly 5 further comprises a water outlet nozzle status light 54. When the water outlet nozzle assembly 5 is discharging water, the water outlet nozzle status light 54 lights up. When the water outlet nozzle assembly 5 does not discharge water, the water outlet nozzle state light 54 is off, thereby reflecting the working state of the water outlet nozzle assembly 5.

The above-mentioned embodiments are only used to illustrate technical solutions of the present disclosure, but not to limit the present disclosure. Although the present disclosure has been described in detail about the foregoing embodiments. It should be understood that those of ordinary skill in the art are still able to modify the technical solutions described in the foregoing embodiments, or equivalently replace some of the technical features in the foregoing embodiments, and these modifications or replacements do not make the essence of the corresponding technical solutions deviate from spirit and scope of the technical solutions of the embodiment of the present disclosure. In particular, as long as there is no structural conflict, the various technical features mentioned in each of the embodiments can be combined in any way. The present disclosure is not limited to the specific embodiments disclosed herein but comprises all technical solutions falling within the scope of the claims.

What is claimed is:

1. A water purifier, comprising: a water tank assembly, a filtration component, a reversing valve, a refrigeration component, a water outlet nozzle assembly and a controller; wherein:

the water tank assembly is configured to store pre-filtration water;

the filtration component comprises a first water inlet end and a first water outlet end, the first water inlet end is fluidly connected with the water tank assembly;

the reversing valve comprises a second water inlet end, a second water outlet end and a third water outlet end; the second water inlet end is fluidly connected with the first water outlet end;

the refrigeration component comprises a cooling pipeline and a refrigeration module for cooling water in the cooling pipeline, one end of the cooling pipeline is connected to the second water outlet end;

the water outlet nozzle assembly is connected to the other end of the cooling pipeline and the third water outlet end respectively;

the controller is electrically connected to the reversing valve and the refrigeration module respectively, the controller is configured to control the second water outlet end and/or the third water outlet end of the reversing valve to be in an open state or a closed state, and to control the refrigeration component to operate;

the refrigeration module comprises an accommodating cavity and a cooling module; a three-way solenoid valve is further provided on a pipeline connecting the second water inlet end and the first water outlet end; the three-way solenoid valve and the cooling module are both electrically connected to the controller;

the three-way solenoid valve comprises a third water inlet end, a fifth water outlet end and a sixth water outlet end; the third water inlet end is fluidly connected with the first water outlet end, and the fifth water outlet end is fluidly connected with the second water inlet end; the three-way solenoid valve is configured to control an opening or a closing of the third water inlet end, the fifth water outlet end, and the sixth water outlet end according to control commands sent by the controller; a top of the accommodating cavity is provided with an accommodating cavity water inlet port, the sixth water outlet end is fluidly connected with the accommodating cavity water inlet port, the cooling pipeline is arranged in the accommodating cavity, the accommodating cavity being filed with water introduced from the accommodating cavity water inlet port and the water serving as a cooling medium, the cooling module is configured to cool the water serving as the cooling medium in the accommodating cavity.

2. The water purifier according to claim 1, further comprising a housing, the housing is provided with an installation area, the water tank assembly is detachably arranged in the installation area; the filtration component, the reversing valve, the refrigeration component, and the controller are all arranged in the housing; the water outlet nozzle assembly is arranged on an outer surface of the housing.

3. The water purifier according to claim 2, further comprising a water collection tray, the housing is provided with a water collection area, and the water collection area is concave, the water outlet nozzle assembly is arranged at a top of the water collection area, the water, wherein the water collection tray and the housing are separately arranged.

4. The water purifier according to claim 2, further comprising an operation panel and a power module, the controller is electrically connected to the operation panel and the power module respectively; the operation panel is arranged on the housing, the power module is arranged in the housing, the operation panel is configured to receive control commands from user's input, the controller is configured to control the second water outlet end and/or the third water outlet end of the reversing valve to be in an open or a closed state according to the control commands, and control the refrigeration component to operate.

5. The water purifier according to claim 2, wherein a water tank detector is installed adjacent to a bottom of the water tank assembly in the installation area, the water tank detector is electrically connected to the controller, a water tank presence detection magnet is installed inside the bottom of the water tank assembly, directly facing the water tank detector, the water tank detector is configured to send a first blocking signal to the controller when it does not detect a magnetic field signal from the water tank presence detection magnet; the controller is further configured to control the second water outlet end and/or the third water outlet end of the reversing valve to be continuously in a closed state according to the first blocking signal.

6. The water purifier according to claim 2, wherein a liquid level sensor is installed adjacent to a side wall of the water tank assembly in the installation area, the liquid level sensor is electrically connected to the controller, a magnetic float is arranged in the water tank assembly, the liquid level sensor is configured to confirm a first liquid level height in the water tank assembly according to a magnetic field signal of the magnetic float in the water tank assembly, and send the magnetic field signal to the controller; and the controller is further configured to send a reminder signal when the first liquid level is lower than a first preset liquid level.

7. The water purifier according to claim 1, wherein the water tank assembly comprises a tank body and a tank cover, a top of the tank body is open, and the tank cover is detachably arranged on the top of the tank body.

8. The water purifier according to claim 1, wherein the filtration component comprises a first filter and a second filter, the first water inlet end is arranged at the first filter, the first water outlet end is arranged at the second filter, a first filter water outlet port is arranged at the first filter, a second water inlet port is arranged at the second filter, and the first filter water outlet port is fluidly connected with the second filter water inlet port.

9. The water purifier according to claim 8, wherein the filtration component further comprises a pressure pump, the pressure pump is electrically connected to the controller; the pressure pump is installed on a pipeline between the first water inlet end and the water tank assembly, or the pressure pump is installed on a pipeline between the first filter water outlet port and the second filter water inlet port.

10. The water purifier according to claim 8, wherein the filtration component further comprises a first TDS detection sensor and a second TDS detection sensor, the first TDS detection sensor and the second TDS detection sensor are electrically connected to the controller respectively, the first TDS detection sensor is installed on the pipeline between the first filter water outlet port and the second filter water inlet port, and the second TDS detection sensor is installed on a pipeline between the first water outlet end and the second water inlet end.

11. The water purifier according to claim 8, wherein the second filter further comprises a fourth water outlet end, and the bottom of the water tank assembly is equipped with a water tank inlet end and a water tank outlet end, the water tank outlet end is fluidly connected with the first water inlet end, the water tank inlet end is fluidly connected with the fourth water outlet end, and a one-way flush valve is installed between the water tank inlet end and the fourth water outlet end; the first water outlet end is further fluidly connected with the water tank inlet end, and a one-way solenoid valve that allows only one-way flow is installed between the first water outlet end and the water tank inlet end; the flush valve and the one-way solenoid valve are electrically connected to the controller respectively, the flush valve is configured to flush the first filter, the second filter and to communicate with a pipeline, and to convey filtered wastewater generated by the second filter back to the water tank assembly, the one-way solenoid valve is configured to convey filtered water discharged from the second filter back to the water tank assembly the water tank inlet end during a flushing process of the flush valve.

12. The water purifier according to claim 1, wherein a first germicidal lamp is arranged on a pipeline fluidly connecting the first water inlet end and the water tank assembly, a second germicidal lamp is provided on a pipeline connecting the water outlet nozzle assembly with the other end of the cooling pipeline and the third water outlet end, and the first germicidal lamp and the second germicidal lamp are electrically connected to the controller respectively.

13. The water purifier according to claim 1, wherein a flow meter is provided on the pipeline between the first water outlet end and the second water inlet end, and the flow meter is electrically connected to the controller.

14. The water purifier according to claim 1, wherein the accommodating cavity is further provided with an accommodating cavity liquid level detection sensor, the accommodating cavity liquid level detection sensor is electrically connected to the controller; the accommodating cavity liquid level detection sensor is configured to detect a second liquid level height in the accommodating cavity, and send a second blocking signal to the controller when the second liquid level is higher than a second preset liquid level, the controller is further configured to control the sixth water outlet end to remain in a closed state according to the second blocking signal, the accommodating cavity liquid level detection sensor is further configured to send a connection signal to the controller when the second liquid level height is lower than a third preset liquid level height, and the controller is further configured to control the sixth water outlet end to be continuously in an open state according to the connection signal.

15. The water purifier according to claim 1, wherein a bottom of the accommodating cavity is provided with a stirring motor, and the stirring motor is electrically connected to the controller; an output end of the stirring motor is provided with a stirring portion, and the stirring portion passes through the bottom of the accommodating cavity and extends into the accommodating cavity.

16. The water purifier according to claim 1, wherein the accommodating cavity is further provided with a first temperature sensor and a cooling module sensor, the first temperature sensor and the cooling module sensor are both electrically connected to the controller.

17. The water purifier according to claim 1, wherein the bottom of the accommodating cavity is provided with a cooling medium discharge port.

18. The water purifier according to claim 1, wherein the cooling module comprises a compressor, a condenser, a cooling fan, a drying filter, a capillary tube and an evaporator pipeline; the evaporator pipeline is arranged in the accommodating cavity, and the compressor and the cooling fan are electrically connected to the controller respectively; a low-pressure pipe inlet port of the compressor is fluidly connected with one end of the evaporator pipeline, a high-pressure pipe outlet port of the compressor is fluidly connected with a condenser inlet port, a condenser outlet port is fluidly connected with the other end of the evaporator pipeline, the cooling fan is arranged on a back of the condenser, and the drying filter and the capillary tube are arranged between the condenser outlet port and the evaporator pipeline.

19. The water purifier according to claim 1, wherein the water outlet nozzle assembly comprises a second temperature sensor, the second temperature sensor is electrically connected to the controller, and the second temperature sensor is configured to detect an actual temperature of the water ultimately discharged from the water purifier.

* * * * *